United States Patent
Biswas

(10) Patent No.: US 10,922,720 B2
(45) Date of Patent: Feb. 16, 2021

(54) MANAGING CONTENT DELIVERY VIA AUDIO CUES

(71) Applicant: Adobe Inc., San Jose, CA (US)

(72) Inventor: Sanjeev Kumar Biswas, Bangalore (IN)

(73) Assignee: Adobe Inc., San Jose, CA (US)

( * ) Notice: Subject to any disclaimer, the term of this patent is extended or adjusted under 35 U.S.C. 154(b) by 812 days.

(21) Appl. No.: 15/403,479

(22) Filed: Jan. 11, 2017

(65) Prior Publication Data
US 2018/0197202 A1    Jul. 12, 2018

(51) Int. Cl.
| | |
|---|---|
| G06Q 30/02 | (2012.01) |
| H04H 60/40 | (2008.01) |
| H04H 60/63 | (2008.01) |
| H04H 60/31 | (2008.01) |
| H04N 21/81 | (2011.01) |
| H04H 60/51 | (2008.01) |
| H04H 60/37 | (2008.01) |
| H04H 60/42 | (2008.01) |
| H04N 21/439 | (2011.01) |
| H04H 60/58 | (2008.01) |
| H04H 60/91 | (2008.01) |
| H04N 21/258 | (2011.01) |

(52) U.S. Cl.
CPC ..... *G06Q 30/0261* (2013.01); *G06Q 30/0242* (2013.01); *G06Q 30/0277* (2013.01); *H04H 60/31* (2013.01); *H04H 60/37* (2013.01); *H04H 60/375* (2013.01); *H04H 60/40* (2013.01); *H04H 60/42* (2013.01); *H04H 60/51* (2013.01); *H04H 60/58* (2013.01); *H04H 60/63* (2013.01); *H04H 60/91* (2013.01); *H04N 21/4394* (2013.01); *H04N 21/812* (2013.01); *H04N 21/25841* (2013.01)

(58) Field of Classification Search
CPC .................................................. G06Q 30/0261
See application file for complete search history.

(56) References Cited

U.S. PATENT DOCUMENTS

| | | | |
|---|---|---|---|
| 6,990,453 | B2 | 1/2006 | Wang et al. |
| 7,346,512 | B2 | 3/2008 | Li-Chun Wang et al. |
| (Continued) | | | |

OTHER PUBLICATIONS

Wang, A.L., "An industrial-strength audio algorithm", ISMIR 2003, 4th Symposium Conference on Music Information Retrieval, pp. 7-13 (2003).

*Primary Examiner* — Peter H Choi
*Assistant Examiner* — Breffni Baggot
(74) *Attorney, Agent, or Firm* — Finch & Maloney PLLC

(57) ABSTRACT

Techniques are disclosed for managing delivery of content and tracking the same via audio cues. For example, a client computing device may monitor ambient sound for audio that matches audio sampled from broadcast content. In response to detecting matching audio, the client computing device transmits tracking data to a centralized content server. The content server records the tracking information and evaluates whether the matching audio was detected within a geographic area associated with the broadcast content. If so, the content server executes additional actions including transmitting supplemental content to the client computing device and/or updating summary level metrics that indicate receptions of broadcast content within target geographic locations.

14 Claims, 21 Drawing Sheets

(56) References Cited

U.S. PATENT DOCUMENTS

| | | |
|---|---|---|
| 7,359,889 B2 | 4/2008 | Wang et al. |
| 7,503,488 B2 | 3/2009 | Davis |
| 7,627,477 B2 | 12/2009 | Wang et al. |
| 7,739,062 B2 | 6/2010 | Wang |
| 7,853,664 B1 | 12/2010 | Wang et al. |
| 7,865,368 B2 | 1/2011 | Li-Chun Wang et al. |
| 7,881,657 B2 | 2/2011 | Wang et al. |
| 7,986,913 B2 | 7/2011 | Wang |
| 8,015,123 B2 | 9/2011 | Barton et al. |
| 8,086,171 B2 | 12/2011 | Wang et al. |
| 8,090,579 B2 | 1/2012 | Debusk et al. |
| 8,190,435 B2 | 5/2012 | Li-Chun Wang et al. |
| 8,290,423 B2 | 10/2012 | Wang |
| 8,386,258 B2 | 2/2013 | Wang et al. |
| 8,442,426 B2 | 5/2013 | Wang et al. |
| 8,543,395 B2 | 9/2013 | Todic |
| 8,571,864 B2 | 10/2013 | Debusk et al. |
| 8,686,271 B2 | 4/2014 | Wang et al. |
| 8,688,248 B2 | 4/2014 | Wang |
| 8,688,600 B2 | 4/2014 | Barton et al. |
| 8,700,407 B2 | 4/2014 | Wang et al. |
| 8,725,829 B2 | 5/2014 | Wang et al. |
| 8,811,885 B2 | 8/2014 | Wang |
| 8,816,179 B2 | 8/2014 | Wang |
| 8,996,380 B2 | 3/2015 | Wang et al. |
| 9,071,371 B2 | 6/2015 | Wang |
| 9,092,518 B2 | 7/2015 | Debusk et al. |
| 9,159,338 B2 | 10/2015 | Powar et al. |
| 9,225,444 B2 | 12/2015 | Wang |
| 9,251,796 B2 | 2/2016 | Wang |
| 9,256,673 B2 | 2/2016 | Wang |
| 9,275,141 B2 | 3/2016 | Wang et al. |
| 9,342,851 B2 | 5/2016 | Musil |
| 9,361,370 B2 | 6/2016 | Wang et al. |
| 9,390,170 B2 | 7/2016 | Wang et al. |
| 9,392,144 B2 | 7/2016 | Biswas et al. |
| 9,401,154 B2 | 7/2016 | Wang et al. |
| 9,451,048 B2 | 9/2016 | Wang |
| 9,697,225 B2 * | 7/2017 | Yun ............... G06F 16/178 |
| 9,721,287 B2 | 8/2017 | Barton et al. |
| 9,773,058 B2 | 9/2017 | Wang et al. |
| 9,864,800 B2 | 1/2018 | Wang et al. |
| 9,899,030 B2 | 2/2018 | Wang et al. |
| 10,003,664 B2 | 6/2018 | Wang et al. |
| 10,129,575 B1 | 11/2018 | Wang et al. |
| 10,158,907 B1 | 12/2018 | Wang et al. |
| 10,166,472 B2 | 1/2019 | Hunt et al. |
| 2002/0072982 A1 | 6/2002 | Barton et al. |
| 2005/0190928 A1 | 9/2005 | Noto |
| 2005/0267817 A1 | 12/2005 | Barton et al. |
| 2007/0244633 A1 * | 10/2007 | Phillips ............ G08B 21/0261 701/408 |
| 2011/0076942 A1 | 3/2011 | Taveau et al. |
| 2011/0191823 A1 | 8/2011 | Huibers |
| 2012/0194737 A1 | 8/2012 | Cafarella et al. |
| 2013/0218686 A1 * | 8/2013 | Muchnik ............ G06Q 10/10 705/14.66 |
| 2013/0272672 A1 | 10/2013 | Padro Rondon et al. |
| 2014/0028914 A1 | 1/2014 | Polak et al. |
| 2014/0106710 A1 | 4/2014 | Rodriguez |
| 2014/0129322 A1 * | 5/2014 | George ............ G06Q 30/02 705/14.45 |
| 2014/0214190 A1 | 7/2014 | Wang |
| 2014/0278845 A1 | 9/2014 | Teiser et al. |
| 2015/0312227 A1 * | 10/2015 | Follis ............ H04L 63/0428 713/176 |
| 2015/0373231 A1 * | 12/2015 | Biswas ............ H04N 5/04 348/515 |
| 2016/0050457 A1 * | 2/2016 | Mondal ............ H04N 21/44204 725/18 |
| 2016/0132600 A1 | 5/2016 | Woodhead et al. |
| 2018/0101610 A1 | 4/2018 | Wang |
| 2018/0197202 A1 * | 7/2018 | Biswas ............ H04H 60/37 |
| 2018/0374491 A1 | 12/2018 | Wang et al. |

* cited by examiner

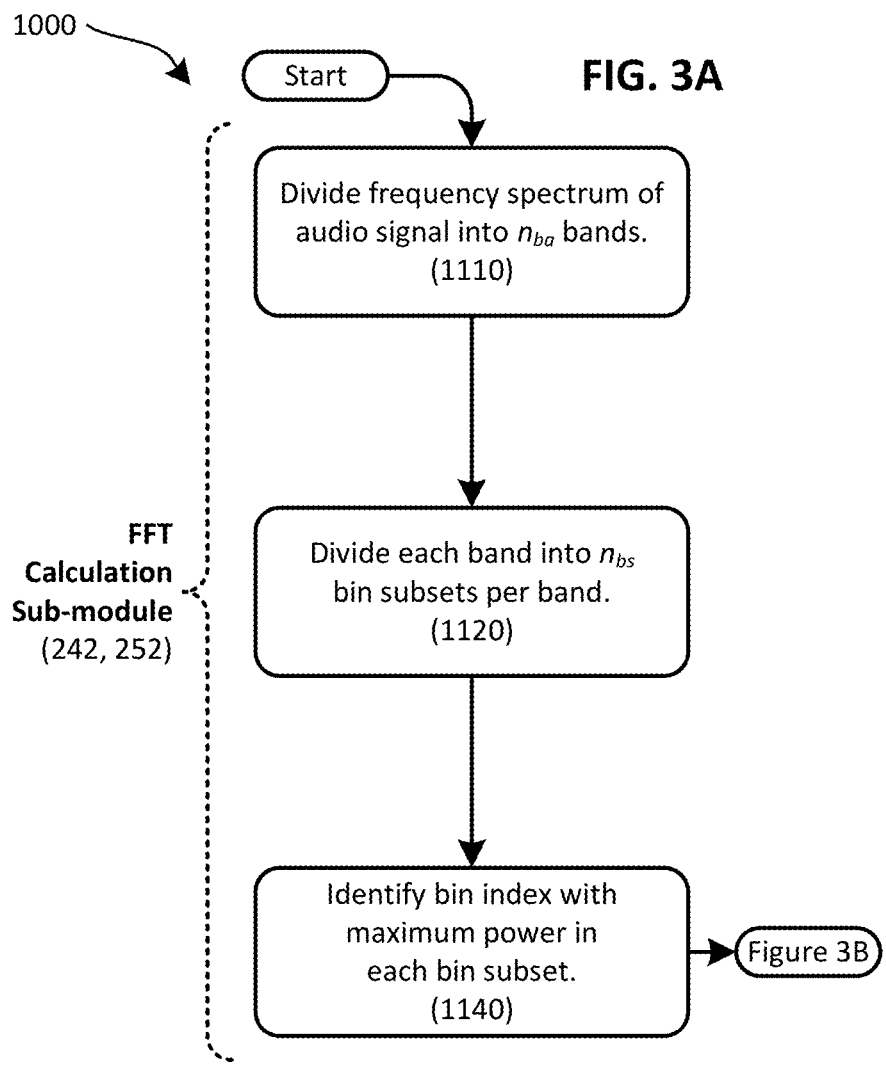

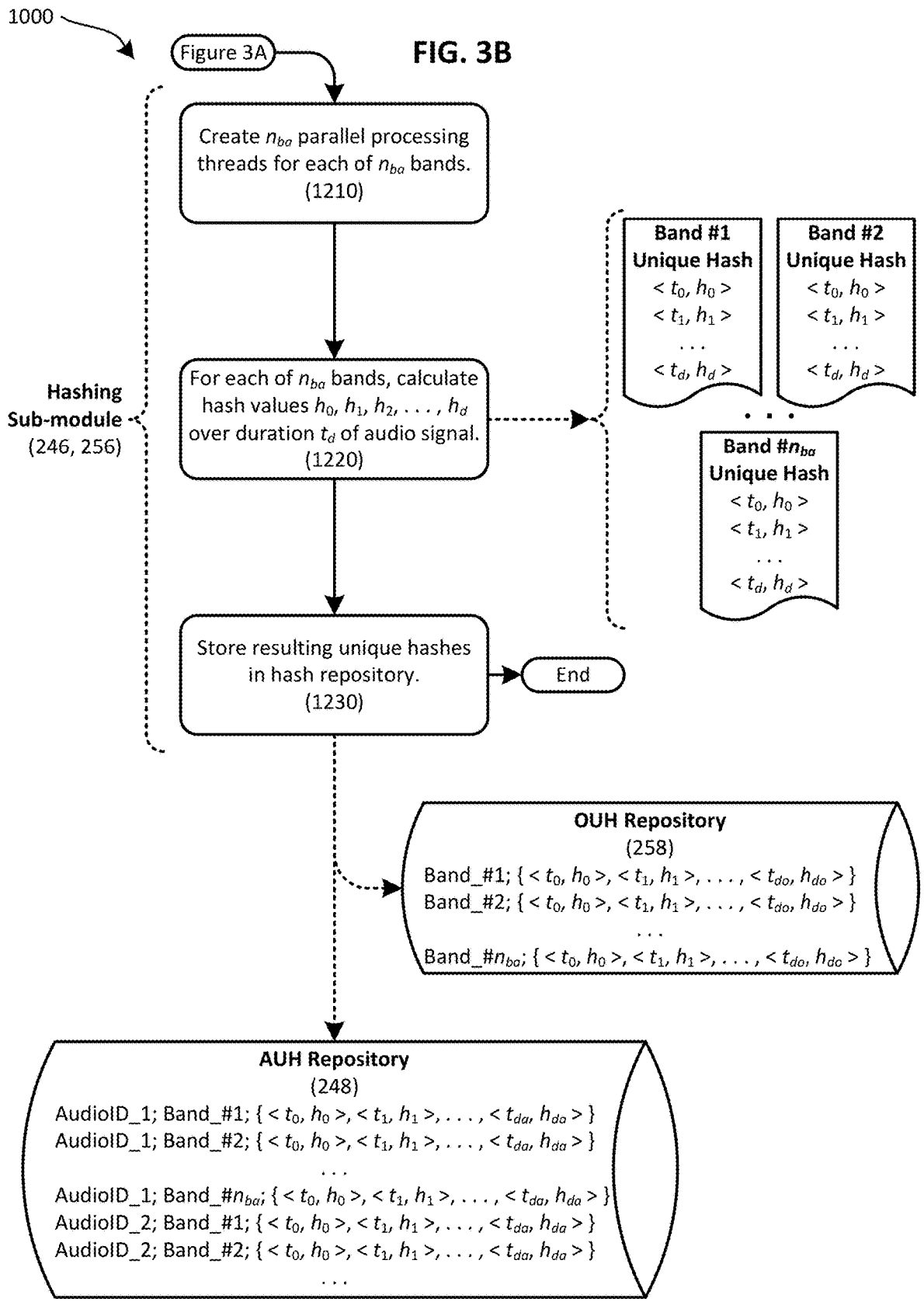

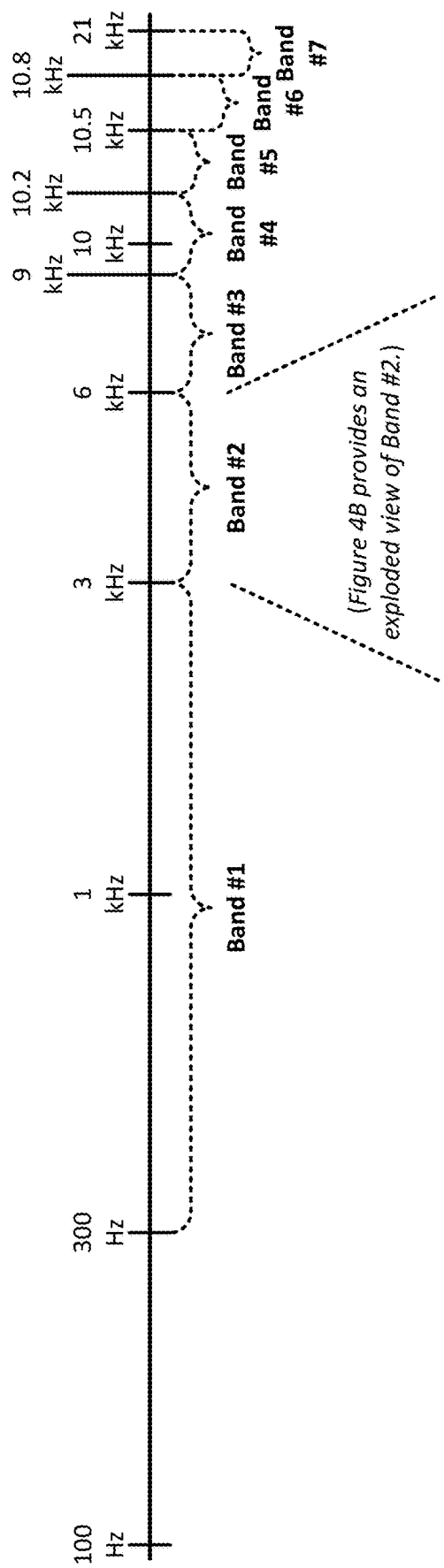

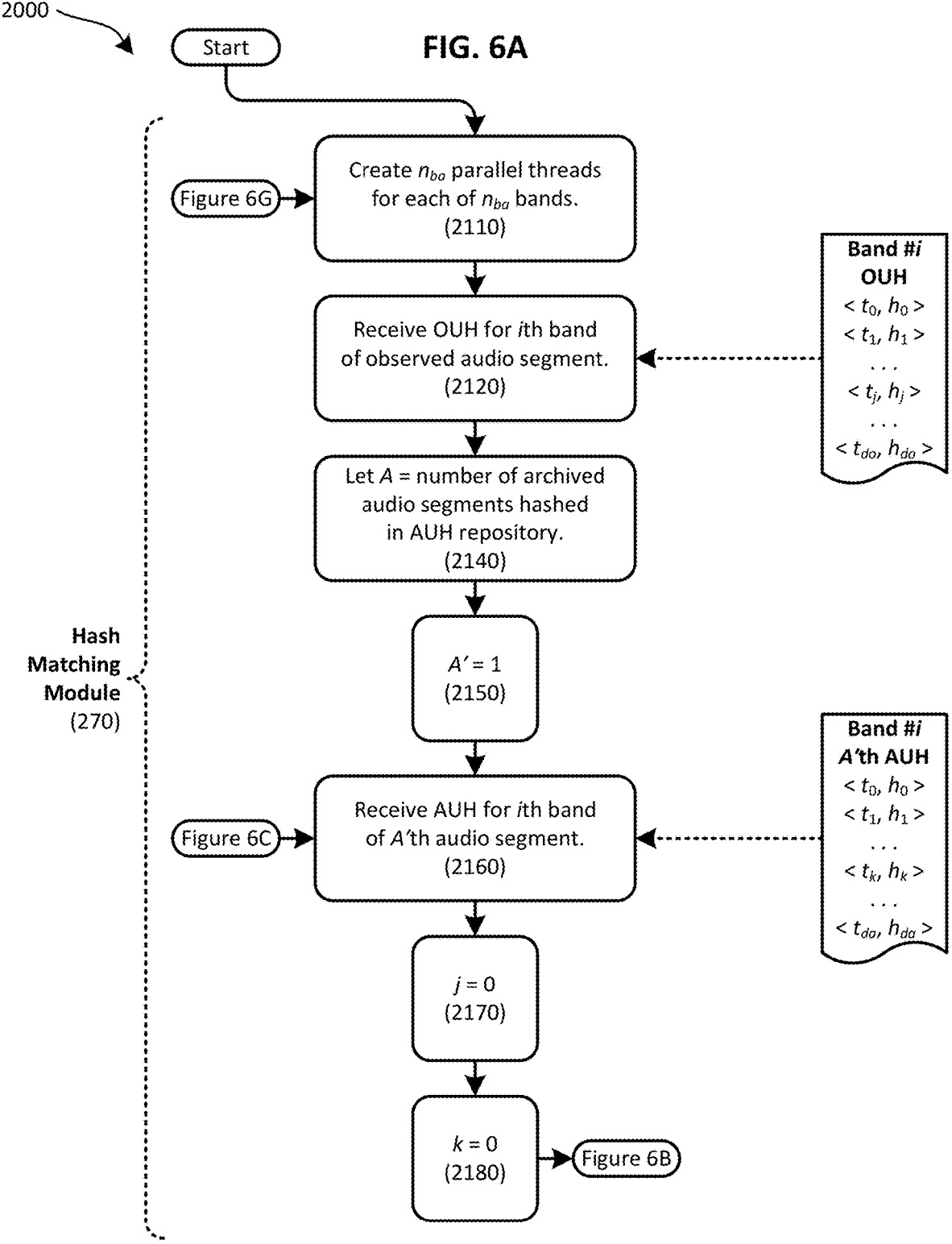

Start

↓

Receiving an observed audio segment at client computing device.
(3100)

↓

Generate a plurality of hash values corresponding to the observed audio segment.
(3200)

↓

Perform a comparison of each of the plurality of hash values to a plurality of archived hash values, wherein each of the plurality of archived hash values is associated with one of a plurality of archived audio segments.
(3300)

↓

Transmit tracking data to content server.
(3400)

↓

Identify applicable distribution rules.
(3500)

↓

Record receptions in clusters and transmit supplemental content.
(3600)

↓

End

US 10,922,720 B2

MANAGING CONTENT DELIVERY VIA AUDIO CUES

FIELD OF THE DISCLOSURE

This disclosure relates generally to content delivery systems, and more specifically, to methods and systems for managing content delivery.

BACKGROUND

The reach of traditional, over-the-air broadcast media is difficult to quantify with precision. Radio and television media sources provide estimates of the number of individuals who are exposed to the content they broadcast, but specific information regarding individuals exposed to broadcast content largely remains a mystery due to the nature of the underlying technology. Over-the-air broadcasts to televisions and radios are not acknowledged. Traditional efforts to collect information regarding individuals exposed to broadcast content include polls, surveys, or other requests for responses from individuals. Such efforts are incomplete and potentially biased because they rely on each individual's willingness and ability to respond accurately.

Some of these shortcomings are addressed by online content management systems. For example, online content providers generally benefit from additional information regarding the sentiment, preferences, and responses of individuals receiving content. However, distribution of online content requires a computing device as an endpoint for the distributed content, and this restriction limits its reach. Consequently, content providers who wish to distribute content widely often utilize both traditional broadcast media and online content distribution. For the reasons explained above, this approach leaves the content providers without precise information regarding the overall reach of their efforts and hampers their ability to follow-up with supplemental content that may be relevant to an individual content reviewer.

BRIEF DESCRIPTION OF THE DRAWINGS

FIG. 2A illustrates selected components of a client computing device, while FIG. 2B illustrates selected components of a content server.

FIGS. 3A and 3B comprise a flowchart illustrating an example method for generating unique hash data based on an observed or archived audio signal in accordance with certain of the embodiments disclosed herein.

FIG. 4A conceptually illustrates the division of an audible frequency spectrum into a plurality of frequency bands which can form the basis of the hashing technique illustrated in FIGS. 3A and 3B.

FIGS. 6A through 6G comprise a flowchart illustrating an example method for synchronizing an observed audio signal with archived video content associated with audio content that matches the observed audio signal in accordance with certain of the embodiments disclosed herein.

FIG. 12 is a flowchart illustrating an example method for managing content in accordance with certain of the embodiments disclosed herein.

DETAILED DESCRIPTION

Figure 1:
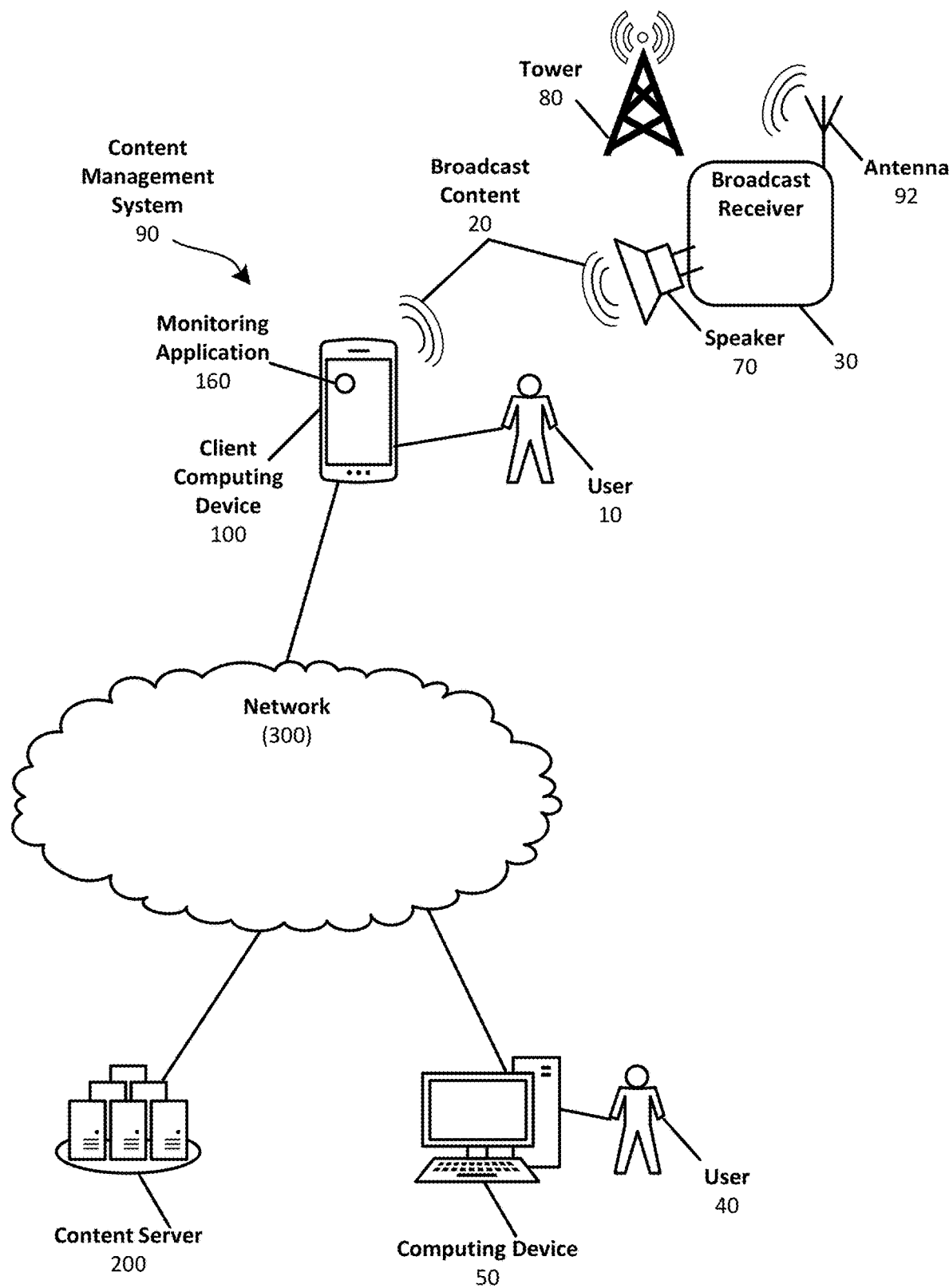
FIG. 1 is a context diagram illustrating a content management system in which distribution of broadcast content is tracked and leveraged in accordance with certain of the embodiments disclosed herein.

Some embodiments disclosed herein implement techniques for managing and tracking delivery of content via audio cues. For example, in one embodiment, a client computing device monitors ambient sound for one or more audio cues that match audio sampled from broadcast content. In response to detecting matching audio, the client computing device transmits tracking data to a content server. Upon receiving the tracking data, the content server records the tracking data and evaluates whether the matching audio was detected within one or more geographic areas associated with the broadcast content. Where the matching audio was detected within one or more such geographic areas, the content server executes additional actions. Examples of these actions include transmitting supplemental content to the client computing device and updating summary level metrics that indicate receptions of broadcast content within the geographic areas.

Conventional broadcast media technology allows content providers to simultaneously distribute content to large numbers of individuals. However, as explained above, conventional broadcast media has several shortcomings, which can be particularly troublesome for content providers who wish to track delivery of their content with particularity. For example, where the content provider is a marketer and the content distributed via the broadcast includes advertisements, the content provider may be keenly interested in understanding who received the content and where the content was received. More specifically, a marketer running an advertisement campaign that leverages broadcast media may be interested in tracking the location and time at which each of a group of potential consumers received a broadcast advertisement. Having this information in hand would allow a marketer to evaluate the effectiveness of the broadcast advertisement and the ability of the marketer's supply chain to conveniently meet the demand generated by the advertisement. Additionally, information regarding the location and time of receipt of an advertisement could be used as a basis to extend follow-up advertisements to potential consumers. For example, a fast food retailer may be interested in following up on a broadcast advertisement for their food products received by potential customers near one of their establishments around noon with a specifically discounted lunch deal. Such a follow-up advertisement would provide additional exposure at a time and location highly relevant to the advertisement itself.

Thus, and in accordance with certain of the embodiments disclosed herein, techniques are disclosed for tracking and acting upon delivery of broadcast content. This broadcast content may include video and/or audio and may be transmitted from a centralized location or facility, such as a cable network, a streaming server, a television broadcast tower, or radio broadcast tower. The broadcast content may be received and presented to a user via, for example, a radio, a television, or a cable box or other computing device. In some embodiments, the broadcast content may include, for example, an advertisement for a product or service.

In some embodiments, a device (e.g., a smartphone) is configured to track delivery of broadcast content at least in part by monitoring for and processing ambient sound which may include audio provided in the broadcast content. When executing according to this configuration in some embodiments, the device executes a monitoring application. The monitoring application records at least a portion of the ambient sound and generates an observed audio segment representative of the recorded ambient sound. The monitoring application also determines whether the observed audio segment is representative of broadcast content. In some embodiments, the monitoring application compares the observed audio segment stored within the tracking data with one or more previously archived audio segments local to the device. These archived audio segments may be representative of various broadcast content. If a match is found between the observed audio segment and an archived audio segment, the monitoring application stores the current time, the current location of the device, an identifier of the device, and an identifier of the archived audio segment within a tracking data structure local to the device. This tracking data can be transmitted to a content server remote from the device.

In some embodiments, the content server is configured to receive and process the tracking data to various ends. For example, when executing according to this configuration in some embodiments, the content server transmits, to the device, supplemental content associated with broadcast content upon confirming that the device received the broadcast content while within a specified geographic area. When executing according to this configuration in some embodiments, the content server searches a distribution rule data structure to identify one or more distribution rules associated with a specific geographic area. In some embodiments, each of the distribution rules stored in the distribution data structure specifies a geographic area, broadcast content, and supplemental content to be transmitted to a device when the device receives the broadcast content within the geographic area. Such specified geographic areas may be referred to wherein as geofences. The supplemental content to be transmitted may include, for example, a follow-up advertisement. In some embodiments, the content server determines whether the device received the broadcast content while within a geofence by comparing the location recorded in the tracking data with the boundaries of the geofence. Where the content server determines that the location is within the geofence, the content server transmits the supplemental content to the device. The device may then present the supplemental content to the user via a media player installed on the device.

In some embodiments, the content server is configured to provide a user interface to users interested in managing content via the content server. According to various embodiments, this user interface can be configured to provide a variety of functionality. For instance, to aid users in analyzing tracking data and managing delivery of content, in some embodiments the user interface is configured to receive input descriptive of geofences. When executing according to this configuration in some embodiments, the user interface receives the input and stores data descriptive of the geofences in a geofence data structure. Geofences identify geographic areas having some commonality of interest to the user. For example, a geofence may be created to surround a store selling products or services marketed by the user. The metes and bounds of particular geofences may be specified, for example, with reference to streets, city blocks, city boundaries, town boundaries, zip code boundaries, state boundaries, and country boundaries.

To aid users in organizing content, in some embodiments the user interface is configured to receive input descriptive of content groups. When executing according to this configuration in some embodiments, the user interface receives the input and stores data descriptive of the content groups in a content group data structure. Each content group may include, for example, related elements of broadcast content associated with particular supplemental content. In some embodiments, a content group includes multiple, discrete broadcast advertisements for products marketed by a single company or a set of related companies. In these embodiments, supplemental content may include follow-up advertisements. Follow-up advertisements may specify group deals that provide benefits (e.g., discounts) if unlocked by, for example, a minimum number of participants accepting the deal. Follow-up advertisements may be particularly relevant to users located within a geofence that includes a retail location at which the products or services referenced in the advertisement are available.

To aid users in establishing content distribution rules, in some embodiments the user interface is configured to receive input that associates elements of one or more content groups with one or more geofences. When executing according to this configuration in some embodiments, the user interface receives the input and stores data descriptive of the distribution rules in a distribution rule data structure. These distribution rules may, for example, instruct the content server to transmit, to a device, supplemental content associated with a content group where broadcast content within the content group is detected while the device is positioned within a geofence identified in the distribution rule. In this way, supplemental content (e.g., follow-up advertisements) may be targeted to devices located in particular physical locations and in response to receipt of associated broadcast content.

In some embodiments, the user interface is configured to present tracking data to a user. When executing according to this configuration in some embodiments, the user interface presents the tracking data overlaid upon a map that also depicts geofences and/or content groups. In this way, the user can review and analyze data built from individually acknowledged receptions of broadcast content, thereby gaining insight as to the number of individuals being exposed to the broadcast content at a specific time and location. Examples of screens that the user interface is configured to present in these embodiments are described further below.

Certain embodiments can be understood as operating in a client-server computing environment, and include both client-side and server-side functionality. For example, a client-side device can be configured to execute the monitoring application. The monitoring application stores and identifies observed audio segments and archived audio segments using unique hash data that represents the various bands that comprise an audible frequency spectrum, thereby increasing the likelihood that a portion of the spectrum having peak power will be hashed at some point. Using this unique hash data, the monitoring application can compare and accurately match observed audio segments with archived audio segments. Several of the disclosed embodiments are specifically configured for, and described in the context of, use with a portable computing device capable of observing ambient audio via a microphone and playing back video content via a display screen and audio content via a speaker. However, it will be appreciated that other embodiments can be implemented using a wide range of other computing devices, including desktop computers and smart television sets. Thus, the present disclosure is not intended to be limited to implementation using any specific type of client computing device.

On the other hand, a server-side device can be configured to execute the content server. For example, in one embodiment the content server stores tracking data, maintains distribution rules, and manages delivery of supplemental content. Other aspects of the content server may be implemented using this server side device.

As used herein, the term "data structure" refers, in addition to its ordinary meaning, to a way of storing and organizing data in a computer accessible memory so that data can be used by an application or software module. A data structure in its simplest form can be, for example, a set of one or more memory locations. In some cases, a data structure may be implemented as a so-called record, sometimes referred to as a struct or tuple, and may have any appropriate number of fields, elements or storage locations. As will be further appreciated, a data structure may include data of interest or a pointer that refers to a memory location where the data of interest can be found. A data structure may have any appropriate format such as, for example, a look-up table or index format; an array format; a hash table format; a graph, tree or hierarchal format having a number of nodes; an object format that includes data fields, for instance similar to a record; or a combination of the foregoing. A data structure may also include executable code for accessing and modifying the underlying structure and format. In a more general sense, the data structure may be implemented as a data set that can store specific values without being constrained to any particular order or format. In one embodiment, a data structure comprises a synchronization map, wherein matching audio hash values are keyed to time pairs associated with observed and archived audio segments. In another embodiment, a data structure comprises a time lag data map for a particular archived audio segment, wherein a particular time lag is keyed to (a) a listing of time pairs associated with observed and archived audio segments, as well as (b) a count of such time pairs. In yet another embodiment a data structure comprises a comprehensive time lag data map for a plurality of archived audio segments, wherein an archived audio segment is keyed to a listing of (time lag, count) data pairs that are sorted by count in decreasing order. In another embodiment, a data structure comprises data that tracks receipt of an observed audio segment that matches an archived audio segment. Each row of this tracking data structure includes fields configured to store a time when the observed audio segment was detected, a location where the observed audio segment was detected, and an identifier of the archived audio segment. In another embodiment, a data structure comprises data that defines geofences. Each row of this geofences data structure includes fields configured to store an identifier of the geofence and one or more identifiers of physical boundaries of the geofence. In another embodiment, a data structure comprises data that defines content groups. Each row of this content groups data structure includes fields configured to store an identifier of the content group and one or more identifiers of content belonging to the content group. In another embodiment, a data structure comprises data that defines distribution rules. Each row of this distribution rules data structure includes fields configured to store an identifier of the distribution rule, an identifier of a content group element used to evaluate the distribution rule, an identifier of a geofence used to evaluate the rule, and supplemental content to be conditionally delivered to a device where the distribution rule applies. Numerous other data structure formats and applications will be apparent in light of this disclosure.

As used herein, the term "content" refers, in addition to its ordinary meaning, to audio, visual, or audiovisual information intended for consumption by a user, organization, or other human- or computer-controlled entity. Examples of content include an audible recording played via speakers or headphones, a visual presentation that includes one or more visual assets which may or may not change with the progression of time, and a combination of both audible and visual assets. Content can therefore be understood as including both audio content and video content in certain applications, and in such case the audio and video portions can be separated and subjected to different processing techniques. Content can be stored in a compressed digital format and may be created and manipulated using any suitable editing application. For example, content can be stored in any suitable file format defined by the Moving Picture Experts Group (MPEG), including MPEG-4, can be stored as a sequence of frames defined in a color space such as red-green-blue (RGB) or luma-chrominance (YUV), or can be stored in any other suitable compressed or uncompressed file format, including file formats generated in real-time by animation engines, compositing engines, or other video generation applications. Content may also include information that is not specifically intended for display, and thus also encompasses items such as embedded executable instructions, scripts, hyperlinks, metadata, encoding information, and formatting information.

As used herein, the term "broadcast content" refers, in addition to its ordinary meaning, to content simultaneously or substantially simultaneously transmitted to multiple receivers. Examples of broadcast content include audio, video, and/or multimedia content transmitted over-the-air, via wired connections, or otherwise to multiple receivers.

As used herein, the term "geofence" refers, in addition to its ordinary meaning, to a user-specified geographic area. Boundaries of a geofence can be defined with reference to existing boundaries, such as streets, blocks, cities, and countries.

System Context

FIG. 1 is a context diagram schematically illustrating selected components of a content management system 90. As shown in FIG. 1, content management system 90 includes a broadcast tower 80, a broadcast receiver 30, a client computing device 100, a network 300, a content server 200, and a computing device 50. Client computing device 100 includes a monitoring application 160 is used by and associated with user 10. Broadcast receiver 30 includes an antenna 92 and a speaker 70. Examples of broadcast receiver 30 may include a television, radio, telephone, desktop computer, or any other device capable of receiving content transmitted via broadcast media. Computing device 50 is used by and associated with user 40. Content server 200, computing device 50, and client computing device 100 are each configured to interconnect and exchange data via network 300.

In accordance with at least some embodiments, select components of content management system 90 are configured to track delivery of broadcast content as follows. Tower 80 transmits a signal encoding the broadcast content over a relatively large geographic area, such as a county or city. Broadcast receiver 30 acquires the signal via antenna 92 and processes the signal to render the broadcast content in a format perceptible by user 10 and detectable by client computing device 100. For instance, broadcast receiver 30 may render the broadcast content as video and/or audio. As illustrated in FIG. 1, the audio includes a broadcast content portion 20 that is rendered by speaker 70 and detected by a microphone or other acoustic sensor configured to detect ambient sound and included in client computing device 100.

Client computing device 100 is configured to execute monitoring application 160 that, in turn, is configured to monitor ambient sound, identify broadcast content, and transmit (e.g., via network 300) tracking data descriptive of the device and the broadcast content to content server 200. When executing according to this configuration in some embodiments, monitoring application 160 records observed audio segments from the ambient sound. The observed audio segments may be, for example, about 5 seconds in duration. One or more of the observed audio segments may include broadcast content portion 20. Monitoring application 160 attempts to identify particular broadcast content included in the observed audio segments by comparing the observed audio segments to previously stored archived audio segments of broadcast content. Where monitoring application 160 matches an archived audio segment to an audio observed segment including, for example, broadcast content portion 20, monitoring application 160 creates tracking data to record reception of the broadcast content and transmits the tracking data to content server 200. This tracking data may include the current time, the location of the device (e.g., longitude and latitude coordinates), an identifier of the device, and an identifier of the broadcast content (e.g., an identifier of the archived audio segment). Monitoring application 160 may collect the current time from a clock internal to client computing device 100 and the location from a location sensor (e.g., a global positioning system chip set) internal to client computing device 100. In some embodiments, client computing device 100 is further configured to receive supplemental content from content server 200 and to present the supplemental content (e.g., follow-up advertisements) to user 10. These and other features of selected configurations of client computing device 100 and monitoring application 160 are described further below with reference to FIGS. 2-8.

As shown in FIG. 1, content server 200 is configured to receive and process tracking data from various client computing devices such as client computing device 100. When executing according to this configuration in some embodiments, content server 200, in response to receiving the tracking data searches for, and applies, any content distribution rules applicable to the tracking data. In some embodiments, content distribution rules drive presentation of supplemental content (e.g., follow-up advertisements) to user 10 via client computing device 100, depending on, for example, the location of client computing device 100 when detecting broadcast content.

When executing according to various configurations of some embodiments, content server 200 serves a user interface to user 40 via network 300 and computing device 50. This user interface interacts with user 40 to enable user 40 to use content server 200. For example, in some embodiments this user interface receives input from the user that associates broadcast content identified in content server 200 with supplemental content identified in content server 200. This broadcast content may include the broadcast content communicated by tower 80 to broadcast receiver 30. The supplemental content may include one or more follow-up advertisements and may be the supplemental content presented to user 10, as described above.

In some embodiments, the user interface served by content server 200 is configured to display the tracking data within the context of a map of the area including the locations where the broadcast content was received and detected. When executing according to this configuration in some embodiments, the user interface also displays one or more geofences within the context of the map and elements of content groups associated with the one or more geofences. In these embodiments, the user interface includes elements that receive input from user 40 that creates, deletes, and/or modifies geofences and content groups within the map. Additionally, in some embodiments, the user interface includes elements that receive input from user 40 that associates geofences with elements of content groups. In some embodiments, content server 200 uses associations generated from this input to construct distribution rules. Examples of screens and processes executed by selected configurations of content server 200, computing device 50, and the user interface are described further below with reference to FIGS. 9-12.

System Architecture

Figure 2A:
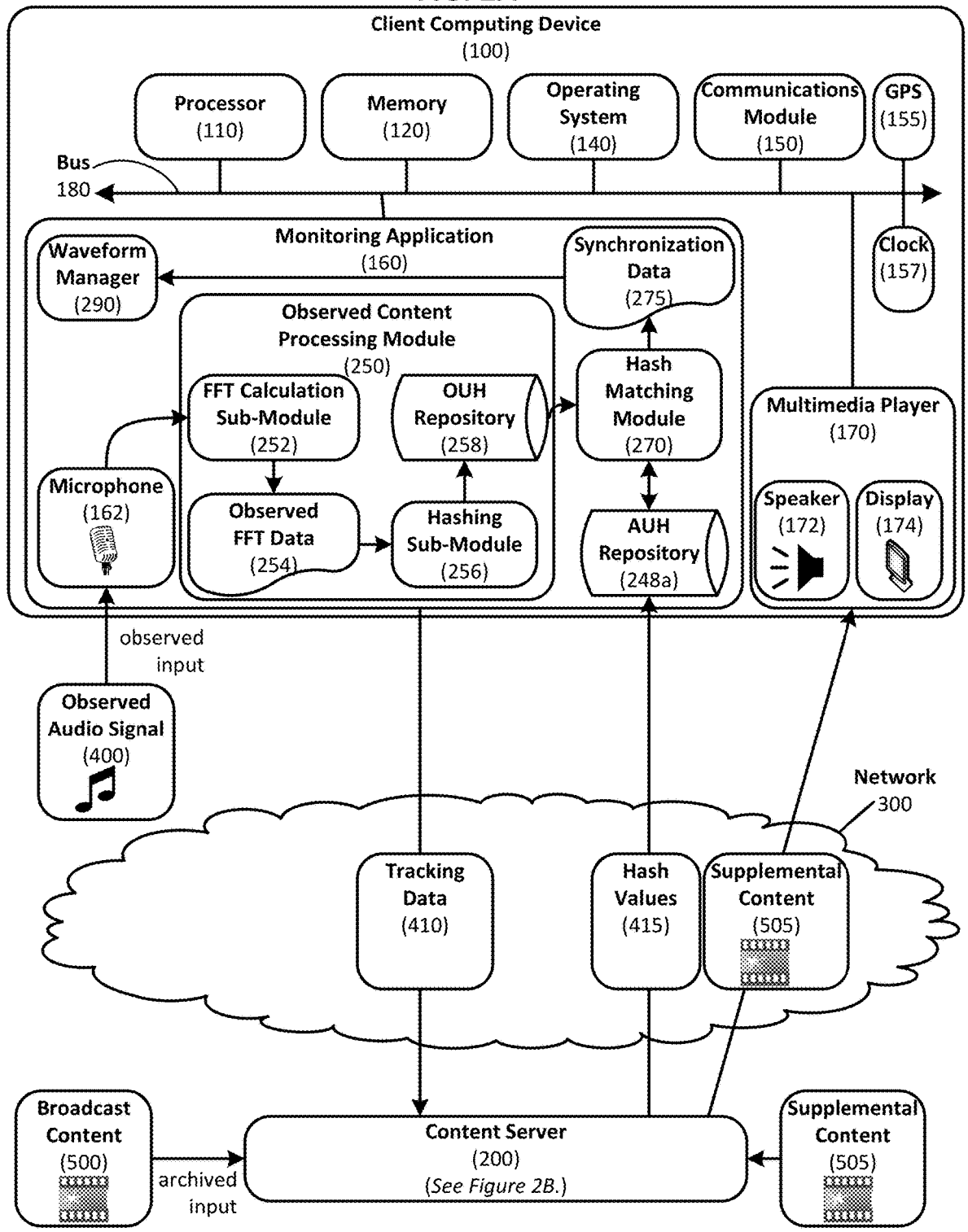
FIGS. 2A and 2B comprise a block diagram schematically illustrating selected components of a computer system that can be used to implement certain of the embodiments disclosed herein. In particular.
Figure 2B:
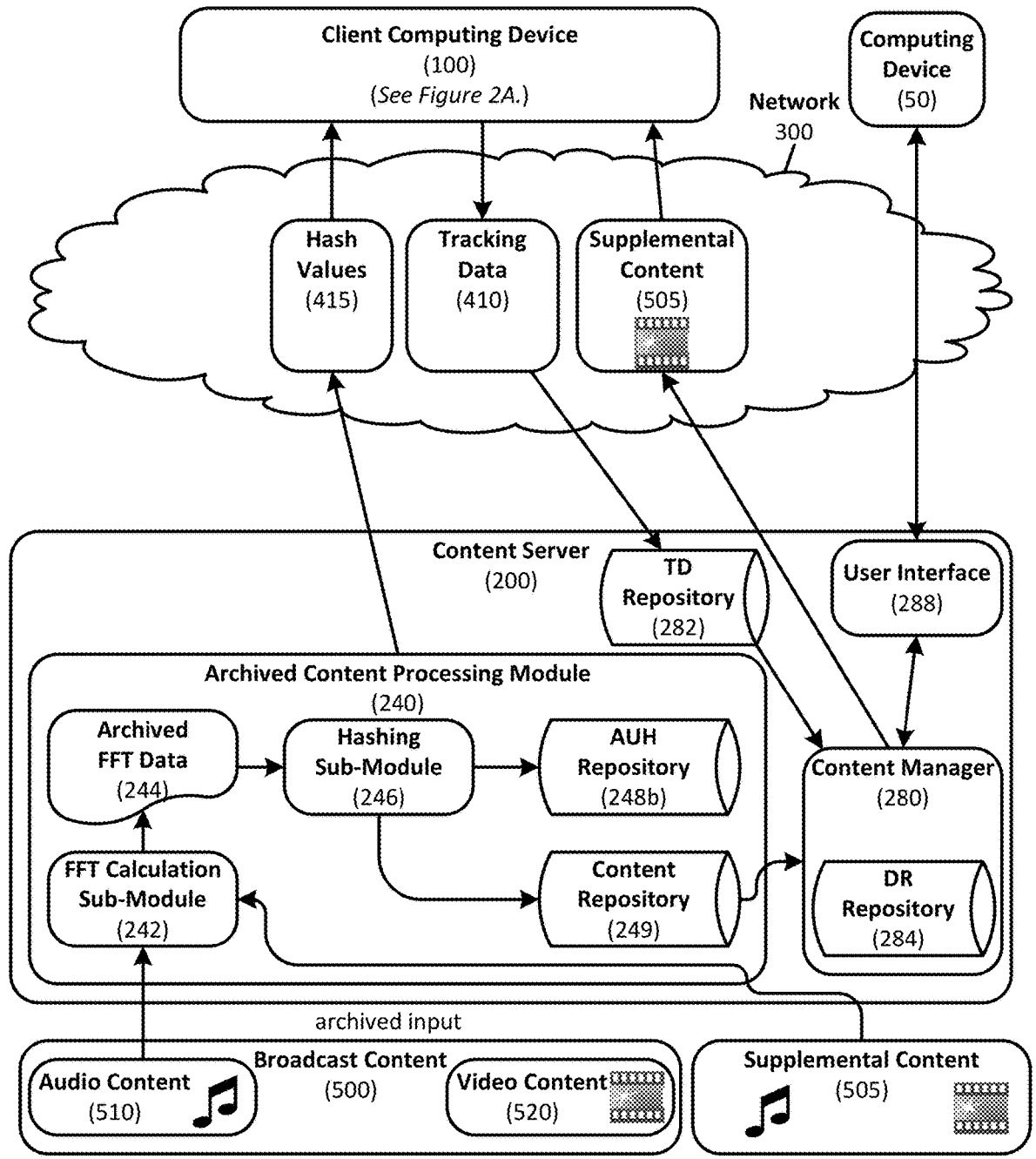

FIGS. 2A and 2B comprise a block diagram schematically illustrating selected components of a networked computer system that can be used to implement certain of the embodiments disclosed herein. Such embodiments can be understood as operating in a client-server computing environment and providing functionality that comprises a series of interactions between a client device that is operated by an end user and a content server that provides additional functionality and data to the client device. To this end, FIG. 2A illustrates selected components of an example client computing device 100, while FIG. 2B illustrates selected components of an example content server 200. The various modules and subcomponents comprising client computing device 100 and content server 200 will be described in turn.

With combined reference to FIGS. 2A and 2B, content server 200 can be understood as receiving one or more items of broadcast content 500 as "archived input." Broadcast content 500 may include audiovisual content that corresponds to audio segments which may be observed by client computing device 100. Any given item of broadcast content 500 may be understood as including audio content 510 and/or video content 520. Archived broadcast content 500 can be processed as described herein, wherein such processing includes separation of the audio content 510 from the video content 520, as appropriate. One result of this processing are hash values 415 which identify an archived audio segment representative of at least a portion of broadcast content 500. In some embodiments, content server 200 transmits the hash values 415 to the client computing device 100. In addition, content server 200 can be understood as receiving one or more items of supplemental content 505. Supplemental content 505 may include audiovisual content to be conditionally presented by the client computing device 100 as determined by the content server 200 through application of one or more distribution rules, which are described further below.

On the other hand, client computing device 100 can be understood as receiving an observed audio signal 400, such as ambient sound provided by a radio broadcast, a music performance, or some other audio source, and providing tracking data 410 to content server 200. In response, content server 200 transmits supplemental content 505 that corresponds to the observed input to client computing device 100. Thus, it will be appreciated that broadcast content 500 and supplemental content 505 may be received before, during, or after a particular audio signal 400 is observed. In certain embodiments, content server 200 receives and archives a large volume of broadcast content 500 and supplemental content 505. Ingestion, processing and storage of a large volume of broadcast content 500 increases the likelihood that observed audio signal 400 will correspond to audio content that has been extracted from broadcast content 500 and processed by content server 200.

Client computing device 100 may comprise, for example, one or more devices selected from a desktop computer, a laptop computer, a workstation, a tablet computer, a smartphone, a set-top box, a server, or any other such computing device. A combination of different devices may be used in certain embodiments. In the example embodiment illustrated in FIG. 2A, client computing device 100 includes, among other things, a processor 110, a memory 120, an operating system 140, a communications module 150, a monitoring application 160, a clock 157, a global positioning system (GPS) chipset 155, and a multimedia player 170. A bus 180 is also provided to allow for intra-device communications using, for example, communications module 150. Computer system 100 is optionally coupled to a network 300 to allow for communications with other computing devices and resources, such as content server 200, a dedicated graphics rendering server, or a cloud-based storage repository. Thus, content server 200 can be local to network 300 or remotely coupled to network 300 by one or more other networks or communication channels. Other componentry and functionality not reflected in the schematic block diagram of FIG. 2A will be readily apparent in light of this disclosure, and it will be appreciated that the present disclosure is not intended to be limited to any particular hardware configuration. Thus other configurations and subcomponents can be used in other embodiments.

Processor 110 can be any suitable processor, and may include one or more coprocessors or controllers, such as a graphics processing unit or an audio processor, to assist in control and processing operations associated with client computing device 100. Memory 120 can be implemented using any suitable type of digital storage, such as one or more of a disk drive, a universal serial bus (USB) drive, flash memory, random access memory, or any suitable combination of the foregoing. Operating system 140 may comprise any suitable operating system, such as Google Android (Google, Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with client computing device 100, and therefore may also be implemented using any suitable existing or subsequently-developed platform. Communications module 150 can be any appropriate network chip or chipset which allows for wired or wireless connection to network 300 and other computing devices and resources. Network 300 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

Still referring to the example embodiment illustrated in FIG. 2A, monitoring application 160 comprises and/or controls a microphone 162, an observed content processing module 250, an archived unique hash (AUH) Repository 248, a hash matching module 270, synchronization data 275, and waveform manager 290. Microphone 162 may comprise any suitable acoustic-to-electric transducer or sensor capable of converting an observed acoustic signal into an electrical signal. Microphone 162 may be used in conjunction with an analog-to-digital converter so as to convert a generated analog signal to a digital signal. Such conversion facilitates subsequent digital signal processing techniques.

In certain embodiments monitoring application 160 is configured to record and process a predetermined duration of audio signal. For example, in one implementation any observed audio segment having sufficient duration to identify a matching archived audio segment can be used. To provide a more specific example, in one embodiment the observed audio segment is between about 5 seconds and about 60 seconds in duration, in another embodiment the observed audio segment is between about 10 seconds and about 30 seconds in duration, and in yet another embodiment the observed audio segment is between about 15 seconds and about 25 seconds in duration. In one specific embodiment, the observed audio segment is 20 seconds in duration. In a modified embodiment monitoring application 160 is configured to record and process an audio signal until such time as an observed audio segment is matched to an archived audio segment, as described below.

Monitoring application 160 includes an observed content processing module 250. Observed content processing module 250 receives and processes observed audio signal 400 as acquired by microphone 162. Observed content processing module 250 includes a fast Fourier transform (FFT) calculation sub-module 252. FFT calculation sub-module 252 is configured to compute a discrete Fourier transform by decomposing a sequence of values into components of different frequencies. In the context of observed content processing module 250, the Fourier transform can be computed based on observed input in the form of observed audio signal 400, and can be understood as generating observed FFT data 254.

Observed content processing module 250 also includes hashing sub-module 256. Hashing sub-module 256 is configured to generate unique hash data based on the observed FFT data 254. Additional details regarding calculation of the unique hash data will be provided in turn. The resulting observed unique hash (OUH) data can be stored in an OUH repository 258.

Still referring to the example embodiment illustrated in FIG. 2A, monitoring application 160 further includes a hash matching module 270. Hash matching module 270 is configured to systematically compare the AUH data stored in AUH repository 248a with the OUH data stored in OUH repository 258. In some embodiments, the AUH data stored in AUH repository 248a is received in the form of hash values 415 from an archived content processing module 240, as is described further below. Where observed audio signal 400 is found to match audio content 510 processed by archived content processing module 240, comparison of the matching hash values will result in synchronization data 275. Such synchronization data 275 can be used by waveform manager 290 to identify particular archived audio content 510 which is likely to correspond to observed audio signal 400. The process executed by the waveform manager 290 to identify particular archived audio content 510 is described further below.

In certain embodiments multimedia player 170 comprises a software application capable of rendering content for review by a user. To this end, multimedia player 170 can be implemented or used in conjunction with a variety of suitable hardware components that can be coupled to or that otherwise form part of client computing device 100. Examples of such hardware components include a speaker 172 and a display 174. Examples of existing multimedia players which can be adapted for use with certain of the disclosed embodiments include Windows Media Player (Microsoft Corp., Redmond, Wash.), QuickTime (Apple Inc., Cupertino, Calif.), and RealPlayer (RealNetworks, Inc., Seattle, Wash.). In certain embodiments multimedia player 170 can be configured to play supplemental content 505 received from content server 200. In certain embodiments operating system 140 is configured to automatically invoke multimedia player 170 upon receipt of supplemental content 505. In embodiments where client computing device 100 is implemented in a client-server arrangement, such as illustrated in FIGS. 2A and 2B, at least some portions of multimedia player 170 can be provided to client computing device 100 using an applet, such as a JavaScript applet, or other downloadable module. Such a remotely accessible module can be provisioned in real-time in response to a request from client computing device 100 for access to a given application server having resources that are of interest to a user of client computing device 100.

Monitoring application 160 or multimedia player 170 can be configured to require a user to login before accessing the functionality described herein. Imposing such a requirement advantageously helps content providers collect additional information with respect to the audience receiving the audio and video content, thereby allowing content providers to target particular market segments with the supplemental content 505. This can be especially useful, for example, in the context of a radio advertiser that wishes to profile its audience and develop content that is specifically intended for such audience.

Turning to FIG. 2B, content server 200 includes an archived content processing module 240 which includes a fast Fourier transform (FFT) calculation sub-module 242. FFT calculation sub-module 242 is configured to compute a discrete Fourier transform by decomposing a sequence of values into components of different frequencies. In the context of archived content processing module 240, the Fourier transform can be computed based on archived input in the form of audio content 510, and can be understood as generating archived FFT data 244.

Archived content processing module 240 also includes hashing sub-module 246. Hashing sub-module 246 is configured to generate unique hash data based on the archived FFT data 244. Additional details regarding calculation of the unique hash data will be provided in turn. The resulting archived unique hash (AUH) data can be stored in an AUH repository 248b and transferred to the AUH repository 248a in the form of hash values 415 via network 300. The archived input processed by archived content processing module 240 also includes supplemental content 505. Consequently, archived content processing module 240 can further be configured to store the supplemental content 505 in a content repository 249, as illustrated in FIG. 2B.

Still referring to the example embodiment illustrated in FIG. 2B, content server 200 further includes a content manager 280. Content manager 280 includes a distribution rules repository 284 and is configured to retrieve tracking data 410 from a tracking data repository 282. The tracking data 410 that identifies an archived audio segment representative of archived audio content 510 detected by the client computing device 100. Based on this identification, content manager 280 increments searches for one or more distribution rules within a distribution rules repository 284, which is maintained by user interface 288. If the content manager 280 finds any applicable distribution rules (e.g., distribution rules associated with archived audio content 510, a location identified in tracking data 410, and supplemental content stored in content repository 249), the content manager 280 applies the distribution rules. In some embodiments, a distribution rule instructs content manager 280 to retrieve the location of the client computing device 100 when the observed audio signal 400 was acquired. This location is specified in tracking data 410. In these embodiments, the distribution rule also instructs content manager 280 to compare the location to a geofence identified in the distribution rule. Where the location falls within the geofence, content manager 280 identifies and retrieves supplemental content 505 associated with the archived audio content 510 from the content repository 249. Supplemental content 505 is then streamed to client computing device 100 via network 300, thereby enabling multimedia player 170 to render supplemental content 505. This allows a user of client computing device 100 to receive the supplemental content 505, which may include, for example, a follow-up advertisement with potential benefits to the user. The content manager 280 may include links or other executable elements within or in association with the follow-up advertisement to facilitate responses from users. A response may indicate that a user wishes to participate in a group deal specified in the follow-up advertisement.

As shown in FIG. 2B, content server 200 is configured to receive tracking data 410 and store tracking data 410 in a tracking data repository 282 from which content manager 280 may retrieve tracking data 410. Also as shown in FIG. 2B, content manager 280 is configured to execute the user interface 288. The user interface 288 serves screens to a user via the computing device 50 as described above with reference to FIG. 1. Examples of these screens are discussed further below with reference to FIGS. 9-12.

The embodiments disclosed herein can be implemented in various forms of hardware, software, firmware, or special purpose processors. For example, in one embodiment a non-transitory computer readable medium has instructions encoded therein that, when executed by one or more processors, cause one or more of the digital signal processing methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment, the system can be hosted on a given website and implemented using JavaScript or another suitable browser-based technology.

The functionalities disclosed herein can optionally be incorporated into a variety of different software applications, such as multimedia players, web browsers, and content editing applications. For example, a multimedia player installed on a smartphone can be configured to observe ambient audio and play corresponding supplemental content based on the server-side audio matching techniques disclosed herein. The computer software applications disclosed herein may include a number of different modules, sub-modules, or other components of distinct functionality, and can provide information to, or receive information from, still other components and services. These modules can be used, for example, to communicate with peripheral hardware components, networked storage resources, or other external components. Other components and functionality not reflected in the illustrations will be apparent in light of this disclosure, and it will be appreciated that the present disclosure is not intended to be limited to any particular hardware or software configuration. Thus, in other embodiments the components illustrated in FIGS. 2A and 2B may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware and be used, and that the present disclosure is not intended to be limited to any particular system architecture.

Methodology: Audio Hashing

FIGS. 3A and 3B comprise a flowchart illustrating an example method 1000 for generating unique hash data based on an observed or an archived audio signal in accordance with certain of the embodiments disclosed herein. Audio hashing method 1000 includes a number of phases and sub-processes, the sequence of which may vary from one embodiment to another. However, when considered in the aggregate, these phases and sub-processes form a complete audio hashing process that is responsive to user commands in accordance with certain of the embodiments disclosed herein. Method 1000 can be implemented using the system architecture illustrated in FIGS. 2A and 2B. For example, in one implementation method 1000 is applied to observed input received in the form of an audio signal 400 observed by client computing device 100 using FFT calculation sub-module 252 and hashing sub-module 256. In another implementation, method 1000 is applied to archived input received in the form of audio content 510 processed by FFT calculation sub-module 242 and hashing sub-module 246. Other system architectures can be used in other embodiments, as will be apparent in light of this disclosure. Thus, the correlation of the various functionalities shown in FIGS. 3A and 3B to the specific components illustrated in FIGS. 2A and 2B are not intended to imply any structural or use limitations. Rather other embodiments may include varying degrees of integration where multiple functionalities are performed by one system or by separate systems. For example, in an alternative embodiment shared FFT calculation and hashing sub-modules are used to process both observed and archived audio signals. Thus, other embodiments may have fewer or more modules and sub-modules depending on the granularity of implementation. Numerous variations and alternative configurations will be apparent in light of this disclosure.

Still referring to FIGS. 3A and 3B, the example audio hashing method 1000 commences with one of the FFT calculation sub-modules 242, 252 dividing the frequency spectrum of an audio signal into $n_{ba}$ distinct frequency bands. See reference numeral 1110 in FIG. 3A. For example, FIG. 4A conceptually illustrates an audible frequency spectrum ranging from 300 Hz to 21 kHz. This constitutes an analyzed spectrum AS spanning approximately 20.7 kHz. In other embodiments, the analyzed spectrum may be smaller or larger depending on the demands of a particular application and the type of audio that is to be analyzed, and thus may range from as small as approximately 7 kHz to as large as approximately 63 kHz. This analyzed spectrum may be divided into a number of frequency bands $n_{ba}$ that is large enough to allow a variety of different frequency ranges to be processed independently, but that is small enough such that each of the frequency bands can be subjected to parallel processing given the processing capacity of client computing device 100 or the content server 200. In one embodiment, the analyzed spectrum is divided into seven frequency bands, although in other embodiments the analyzed spectrum may be divided into as few as one frequency band or as many as fifteen frequency bands.

As illustrated in FIG. 4A, in an embodiment where a 20.7 kHz frequency spectrum is divided into $n_{ba}=7$ frequency bands, the frequency spectrum per band $f_{ba}$ is defined by $$f_{ba} = \frac{AS}{n_{ba}} = \frac{20.7 \text{ kHz}}{7 \text{ bands}} \approx 3 \text{ kHz } band^{-1}. \tag{1}$$

The first frequency band can be understood as ranging from 300 Hz to 3 kHz, the second frequency band can be understood as ranging from 3 kHz to 6 kHz, the third frequency band can be understood as ranging from 6 kHz to 9 kHz, and so forth, as illustrated in FIG. 4A. Thus, it is not necessary for each frequency band to cover an identical spectral range, and certain frequency bands may be slightly larger or smaller than other frequency bands.

Figure 4B:
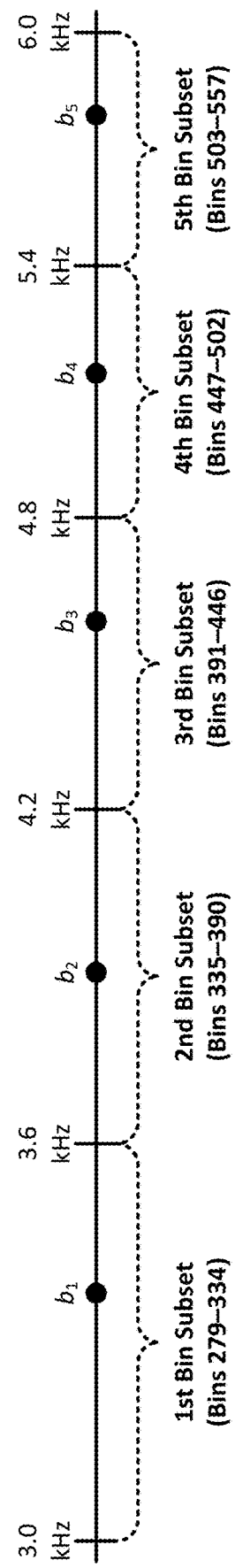
FIG. 4B conceptually illustrates the division of a frequency band of FIG. 4A into a plurality of frequency bin subsets which can form the basis of the hashing technique illustrated in FIGS. 3A and 3B.

Each of the frequency bands is, in turn, divided into $n_{bs}$ bin subsets per frequency band. See reference numeral 1120 in FIG. 3A. In particular, each of the frequency bands can be divided into a number of bin subsets $n_{bs}$ that is large enough to allow a variety of different frequency ranges to be analyzed independently, but that is small enough such that signal processing associated with the various bin subsets does not overwhelm processing capacity. In one embodiment, each frequency band is divided into five bin subsets per band, although in other embodiments each frequency band is divided into as few as two bin subsets per band or as many as ten bin subsets per band. Each of the frequency bands is not necessarily divided into the same number of bin subsets. FIG. 4B, which provides an exploded view of the second frequency band illustrated in FIG. 4A, conceptually illustrates the division of this frequency band into $n_{bs}=5$ bin subsets per band. In this case, the frequency spectrum per bin subset $f_{bs}$ is defined by $$f_{bs} = \frac{f_{ba}}{n_{bs}} \approx \frac{3 \text{ kHz } band^{-1}}{5 \text{ bin subsets } band^{-1}} \approx 600 \text{ Hz bin } subset^{-1}. \quad (2)$$

Thus, the first bin subset can be understood as ranging from 3.0 kHz to 3.6 kHz, the second bin subset can be understood as ranging from 3.6 kHz to 4.2 kHz, the third bin subset can be understood as ranging from 4.2 kHz to 4.8 kHz, and so forth, as illustrated in FIG. 4B. Such subdivision can be performed in similar fashion for the other frequency bands as well.

The FFT techniques applied by FFT calculation sub-modules 242, 252 are based on a given sampling rate SR and window size WS. For example, in one embodiment FFT calculation sub-modules 242, 252 use a sampling rate of 44.1 kHz, although sampling rates ranging from 8 kHz to 5.64 MHz can be used in other embodiments, depending on the nature of the audio signal being analyzed. Likewise, in one embodiment FFT calculation sub-modules 242, 252 use a FFT window size having 4096 bins, although in window sizes ranging from 1024 bins to 16834 bins can be used in other embodiments, depending on the nature of the audio signal being analyzed and the processing capacity of content server 200. The ratio of the sampling rate to the window size defines the frequency resolution FR of the resulting FFT analysis. For instance, in the example embodiment illustrated in FIG. 4B, the frequency resolution FR is $$FR = \frac{SR}{WS} = \frac{44.1 \text{ kHz}}{4096 \text{ bins}} \approx 10.77 \text{ Hz } bin^{-1}. \quad (3)$$

Thus, where the first bin subset ranges from 3.0 kHz to 3.6 kHz, this spectral range can be understood as corresponding to bins ranging from 3.0 kHz÷10.77 Hz bin$^{-1}$=279th bin to 3.6 kHz÷10.77 Hz bin$^{-1}$=334th bin. In other words, the first bin subset illustrated in FIG. 4B is associated with bins having a bin index ranging from 279 to 334. Thus, it will be appreciated that each point on the audible frequency spectrum illustrated in FIG. 4A can be associated with a particular frequency band, a particular bin subset, and a particular bin. In certain embodiments, standard windowing operations, such as a Hanning window function, can be applied to reduce the extent of spectral leakage.

Each bin comprising the audible spectrum illustrated in FIG. 4A can be understood as being associated with an average power over the frequencies that fall within that bin. Therefore, of the several bins that comprise a given bin subset, as illustrated in FIG. 4B, at least one of those bins will have a maximum average power compared to the other bins comprising the bin subset. In this case, $b_p$ can be understood as the index of the bin having the maximum power in the pth bin subset. Thus, in certain embodiments, after the audible frequency spectrum has been divided into $n_{ba}$ frequency bands and $n_{bs}$ bin subsets per band, a bin index associated with the maximum power in each bin subset is identified. See reference numeral 1140 in FIG. 3A. Therefore, each frequency band will be associated with $n_{bs}$ bin subsets and a corresponding set of $n_{bs}$ bin indices (in FIG. 4B $\{b_1, b_2, b_3, b_4, b_5\}$) corresponding to the maximum power within each bin subset.

Figure 5:
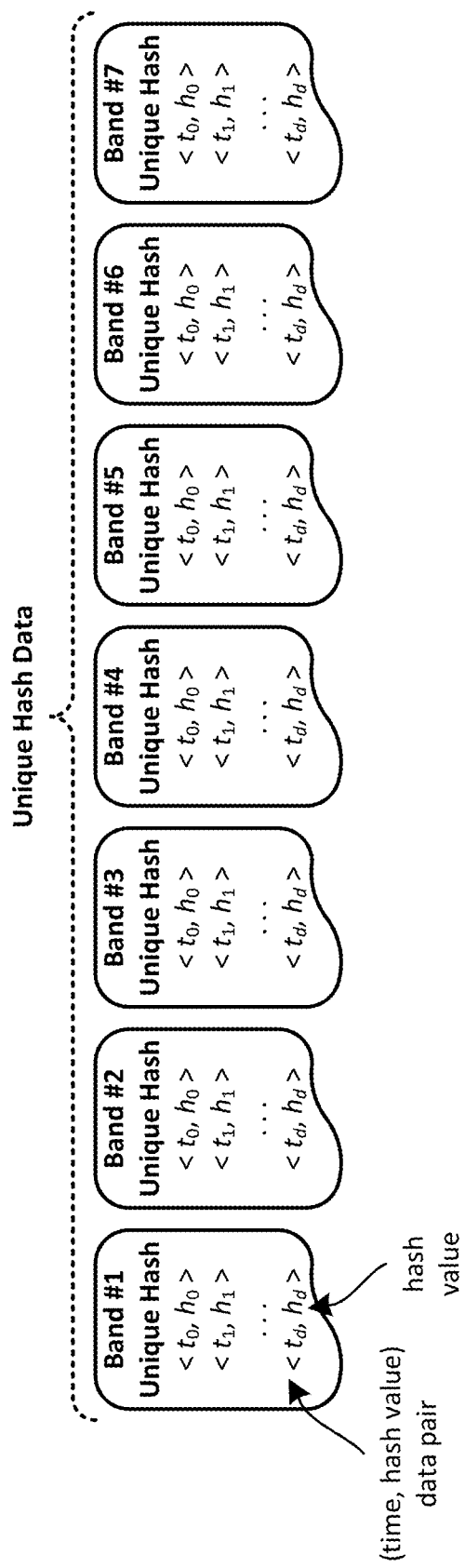
FIG. 5 conceptually illustrates the structure of the unique hash data that is produced by the hashing technique illustrated in FIGS. 3A and 3B, wherein the unique hash data comprises a plurality of unique hashes, each of which in turn comprises a plurality of (time, hash value) data pairs.

As illustrated in FIG. 3B, hashing sub-module 246 can be used to generate AUH data from audio content 510 that is extracted from archived content 500. Likewise, hashing sub-module 256 can be used to generate OUH data from observed audio signal 400. FIG. 5 illustrates that, in either case, unique hash data can be understood as comprising $n_{ba}$ unique hashes corresponding to each of the $n_{ba}$ frequency bands into which the analyzed spectrum is divided. Each of the $n_{ba}$ unique hashes in turn comprises a set of (time, hash value) data pairs, wherein the quantity of (time, hash value) data pairs in each unique hash depends on the duration of the audio segment being hashed and the hashing time interval. The unique hash data can be generated faster if each of the $n_{ba}$ frequency bands are processed in parallel. Thus, in certain embodiments hashing sub-modules 246, 256 are configured to create $n_{ba}$ parallel processing threads for each of the $n_{ba}$ frequency bands. See reference numeral 1210 in FIG. 3B.

A sequence of unique hash values $\{h_0, h_1, h_2, \ldots h_d\}$ is calculated over the duration $t_d$ of the audio segment being analyzed for each of the $n_{ba}$ frequency bands. See reference numeral 1220 in FIG. 3B. These calculations can be performed by the $n_{ba}$ parallel processing threads. Each processing thread therefore can be understood as generating a set of (time, hash value) data pairs that comprise a particular one of the $n_{ba}$ unique hashes. The quantity of (time, hash value) data pairs in each unique hash depends on the duration of the audio segment being hashed and the hashing time interval. In one embodiment, the hash value for a given frequency band at a given time depends on the $n_{bs}$ maximum power bin indices at the given time for the $n_{bs}$ bin subsets comprising the given band. For example, where each frequency band comprises five bin subsets (such as illustrated in FIG. 4B) the hash value corresponding to time to depends on the set of bin indices $\{b_1, b_2, b_3, b_4, b_5\}$ associated with the maximum power for each of the five bin subsets at time $t_0$. In one embodiment, different hash values are calculated at one-second intervals, although more or less frequent intervals can be used in other embodiments.

Any of a variety of suitable hashing functions can be used to generate a hash value from the $n_{bs}$ maximum power bin indices. For example, in one embodiment a unique hash value h can be defined by a powered sum of the bin indices associated with the maximum power for each of the $n_{bs}$ bin subsets, such as:

$$h(b_1, b_2, b_3, b_4, b_5) = \{b_5 - [(b_5 \%3) > 0 ? 2 : 0]\}10^{11} + \quad (4)$$
$$\{b_4 - [(b_4 \%3) > 0 ? 2 : 0]\}10^8 + \{b_3 - [(b_3 \%3) > 0 ? 2 : 0]\}10^5 +$$
$$\{b_2 - [(b_2 \%3) > 0 ? 2 : 0]\}10^2 + \{b_1 - [(b_1 \%3) > 0 ? 2 : 0]\},$$

wherein the expression (logical) ? a:b evaluates to a if the logical expression is true, and evaluates to b if the logical expression is false. Equation (4) produces a unique hash value based on the set of bin indices $\{b_1, b_2, b_3, b_4, b_5\}$ associated with the maximum power for each of the five bin subsets at a given time. Bin indices $b_p$, $b_p+1$, and $b_p+2$ are treated the same to introduce a degree of tolerance into the hashing process. This degree of tolerance can be increased, decreased, or wholly omitted in other embodiments. The hashing calculation provided by Equation (4) can be modified in alternative embodiments, and thus it will be appreciated that other calculations can be used in such embodiments. For example, in an alternative embodiment the hash value is calculated based on a subset of the $n_{bs}$ maximum power bin indices without any degree of tolerance. One example of such a hashing function is provided by:

$$h(b_1, b_2, b_3, b_4) = [b_4 - (b_4 \ \%3)]10^8 + \\ [b_3 - (b_3 \ \%3)]10^5 + [b_2 - (b_2 \ \%3)]10^2 + [b_1 - (b_1 \ \%3)]. \quad (5)$$

Once generated, the $n_{ba}$ unique hashes are stored in an appropriate hash repository. See reference numeral 1230 in FIG. 3B. For example, where method 1000 is applied to observed input received in the form of observed audio signal 400 observed by client computing device 100, the resulting $n_{ba}$ unique hashes can be stored in OUH repository 258. FIG. 3B illustrates an example data structure which may be used in conjunction with OUH repository 258, wherein each of the $n_{ba}$ bands is associated with a set of (time, hash value) data pairs. On the other hand, where method 1000 is applied to archived input received in the form of audio content 510, the resulting $n_{ba}$ unique hashes can be stored in AUH repository 248. FIG. 3B also illustrates an example data structure which may be used in conjunction with AUH repository 248, wherein each of the $n_{ba}$ bands is associated with (a) a set of (time, hash value) data pairs and (b) an AudioID_q parameter. The AudioID_q parameter corresponds to a qth audio segment that has been processed by archived content processing module 240. Thus, while OUH repository 258 can be understood as storing unique hash data corresponding to a single observed audio segment, AUH repository 248 can be understood as storing unique hash data corresponding to a plurality of archived audio segments. Once the unique hash data has been stored in an appropriate hash repository, the hashing method 1000 may be considered complete.

In certain embodiments archived content processing module 240 can be used to apply hashing methodology 1000 to a large quantity of content 500 before it is attempted to synchronize an observed audio signal with an archived audio signal. In particular, processing a large quantity of content 500 increases the likelihood that an appropriate match will be found for a subsequently-observed audio segment. In such embodiments archiving content 500 comprises (a) receiving content 500 that comprises audio content 510 and video content 520; (b) separating audio content 510 from video content 520; and (c) generating AUH data based on audio content 510. Separately, content processing module 240 can be used to store supplemental content 505 in video content repository 249. Supplemental content 505 can be indexed by the same AudioID_q parameter used in AUH repository 248, such that once a particular AudioID_q parameter is identified as matching an observed audio segment, the corresponding supplemental content can be retrieved. Compilation of AUH data enables such data to be used in a subsequent matching process, as will be described in turn. While certain embodiments involve compilation of a large quantity of AUH data before the matching processes are attempted, it will be appreciated that in other embodiments content 500 can continue to be received and processed even after matching commences.

Methodology: Audio Matching

FIGS. 6A through 6G comprise a flowchart illustrating an example method 2000 for matching observed audio signal 400 with archived audio content 510 in accordance with certain of the embodiments disclosed herein. Matching method 2000 includes a number of phases and sub-processes, the sequence of which may vary form one embodiment to another. However, when considered in the aggregate, these phases and sub-processes form a complete matching process that is responsive to user commands in accordance with certain of the embodiments disclosed herein. Method 2000 can be implemented using the system architecture illustrated in FIGS. 2A and 2B. For example, in one implementation method 2000 is applied to observed unique hash data generated by observed content processing module 250. Other system architectures can be used in other embodiments, as will be apparent in light of this disclosure. Thus, the correlation of the various functionalities shown in FIGS. 6A through 6G to the specific components illustrated in FIGS. 2A and 2B are not intended to imply any structural or use limitations. Rather other embodiments may include varying degrees of integration where multiple functionalities are performed by one system or separate systems. Thus, other embodiments may have fewer or more modules and sub-modules depending on the granularity of implementation. Numerous variations and alternative configurations will be apparent in light of this disclosure.

In certain embodiments, the example matching method 2000 commences once observed content processing module 250 generates OUH data based on an observed audio signal 400. Because significant portions of method 2000 are applied individually to the $n_{ba}$ frequency bands comprising the audible spectrum, the processing associated with method 2000 can be expedited through the use of parallel processing techniques. Therefore, in certain embodiments hash matching module 270 is configured to create $n_{ba}$ parallel processing threads for each of the $n_{ba}$ frequency bands. See reference numeral 2110 in FIG. 6A. Thus, it will be appreciated that at least some the subsequent processing techniques, which are described herein as generally being applied to a specific ith frequency band of the observed audio segment, can be applied to all $n_{ba}$ frequency bands simultaneously.

Parallel processing over $n_{ba}$ frequency bands increases the likelihood that frequencies will be hashed where a particular audio signal has strong frequency power. For example, a first archived audio segment may have strong frequency power in a first frequency band, while a second archived audio segment may have strong frequency power in a second frequency band. By hashing an observed audio segment in both frequency bands, this ensures that AUH data from a strong frequency power spectrum of both the first and second archived audio segments is compared with OUH data from the same frequency spectrum of the observed audio segment.

Hash matching module 270 is configured to receive an observed unique hash for the ith frequency band of an observed audio segment. See reference numeral 2120 in FIG. 6A. As described and illustrated herein, the observed unique hash comprises a set of (time, hash value) data pairs derived from a single observed audio segment. In contrast, AUH repository 248 includes AUH data associated with an arbitrary quantity of archived audio segments A. That is, A is defined as the number of archived audio segments having AUH data stored in AUH repository 248. See reference numeral 2140 in FIG. 5A. Audio segment counting parameter A' is set such that A'=1. See reference numeral 2150 in FIG. 6A. The archived unique hash for the ith frequency band of the A'th audio segment is then retrieved. See reference numeral 2160 in FIG. 6A. Like the observed unique hash, the archived unique hash also comprises a set of (time, hash value) data pairs derived from the ith frequency band of an audio segment.

Because the observed and archived audio segments are not necessarily the same duration, the observed and archived hashes may have different quantities of (time, hash value) data pairs. For instance, FIG. 6A illustrates the observed unique hash as having a duration $t_{do}$ while the archived unique hash has a duration $t_{da}$. In general, $t_{do}$ will be less than $t_{da}$ because the observed audio segment is a short recording of the complete archived audio segment, although this will not necessarily be the case. Regardless of the relative lengths of the observed and archived audio segments, separate counting parameters are used to iterate over the hash values comprising the observed and archived unique hashes, thereby making it possible to compare all of the hash values of the observed unique hash to all of the hash values of the archived unique hash. Specifically, observed unique hash value counting parameter j is set such that j=0. See reference numeral 2170 in FIG. 6A. And archived unique hash value counting parameter k is set such that k=0. See reference numeral 2180 in FIG. 6A.

Once the counting parameters j and k are set, the jth hash value of the observed unique hash ($h_j$) is compared to the kth hash value of the archived unique hash that is associated with the A'th archived audio segment ($h_k$). See reference numeral 2210 in FIG. 6B. If $h_j=h_k$, the time $t_j$ that corresponds to hash value $h_j$ and the time $t_k$ that corresponds to hash value $h_k$ are stored in a synchronization map 275a for the A'th audio segment, wherein synchronization map 275a is keyed by the matching hash values $h_j=h_k$. See reference numeral 2212 in FIG. 6B. As illustrated in FIG. 7, synchronization map 275a can be understood as forming part of synchronization data 275 that is generated by hash matching module 270. More specifically, synchronization map 275a includes M matching hash pairs $\{(h_{j1}=h_{k1}), (h_{j2}=h_{k2}), \ldots, (h_{jM}=h_{kM})\}$, each of which is keyed to L time pairs $\{(t_{j1}, t_{k1}), (t_{j2}, t_{k2}), \ldots, (t_{jL}, t_{kL})\}$. Because the observed and archived unique hashes may match at more than one time, a given matching hash pair may be keyed to a plurality of (observed, archived) time pairs.

Regardless of whether or not $h_j=h_k$, the archived unique hash value counting parameter k is incremented by one. See reference numeral 2220 in FIG. 6B. Once the archived unique hash value counting parameter k has been appropriately incremented, it is determined whether all of the archived unique hash values associated with the A'th archived audio segment have been compared to the jth hash value of the observed unique hash. See reference numeral 2230 in FIG. 6B. In particular, if the incremented archived unique hash counting parameter k is less than or equal to the total quantity of archived unique hash values associated with the A'th archived audio segment |AUH(A')|, then the incremented kth hash value of the archived unique hash ($h_k$) can be compared to the jth hash value of the observed unique hash ($h_j$). See reference numeral 2210 in FIG. 6B.

However, if the incremented archived unique hash counting parameter k is greater than the total quantity of archived unique hash values associated with the A'th archived audio segment |AUH(A')|, this indicates that all of the archived unique hash values for audio segment A' have been compared to the jth hash value of the observed unique hash. In this case, the observed unique hash value counting parameter j is incremented by one. See reference numeral 2240 in FIG. 6B. Once the observed unique hash value counting parameter j has been appropriately incremented, it is determined whether all of the observed unique hash values have been compared to the hash values comprising the archived unique hash. See reference numeral 2250 in FIG. 6B. In particular, if the incremented observed unique hash counting parameter j is less than or equal to the total quantity of observed unique hash values |OUH|, then the archived unique hash value counting parameter k is reset such that k=0. See reference numeral 2252 in FIG. 6B. The zeroth hash value of the archived unique hash ($h_0$) is then compared to the incremented jth hash value of the observed unique hash ($h_j$). See reference numeral 2210 in FIG. 6B. On the other hand, if the incremented observed unique hash counting parameter j is greater than the total quantity of observed unique hash values |OUH|, this indicates that all of the archived unique hash values for audio segment A' have been compared to all of the observed unique hash values. Thus, FIG. 6B illustrates a process for comparing all archived unique hash values for audio segment A' to a selected observed unique hash value, and repeating this comparison for all observed unique hash values.

If all of the archived unique hash values for audio segment A' have been compared to all of the observed unique hash values, it is determined whether or not synchronization map 275a is empty. See reference numeral 2260 in FIG. 6B. If synchronization map 275a is empty, this indicates that no match exists between the ith band of the observed audio segment and the ith band of the A'th archived audio segment. See reference numeral 2310 in FIG. 6C. In this case, the audio segment counting parameter A' is incremented by one. See reference numeral 2320 in FIG. 6C. Once the audio segment counting parameter A' is incremented, it is determined whether all of the archived audio segments have been compared to the observed audio segment. See reference numeral 2330 in FIG. 6B. In particular, if the incremented audio segment counting parameter A' is less than or equal to the total quantity of archived audio segments A, then the archived unique hash for the ith frequency band of the incremented A'th audio segment is retrieved. See reference numeral 2160 in FIG. 6A.

Figure 6B:
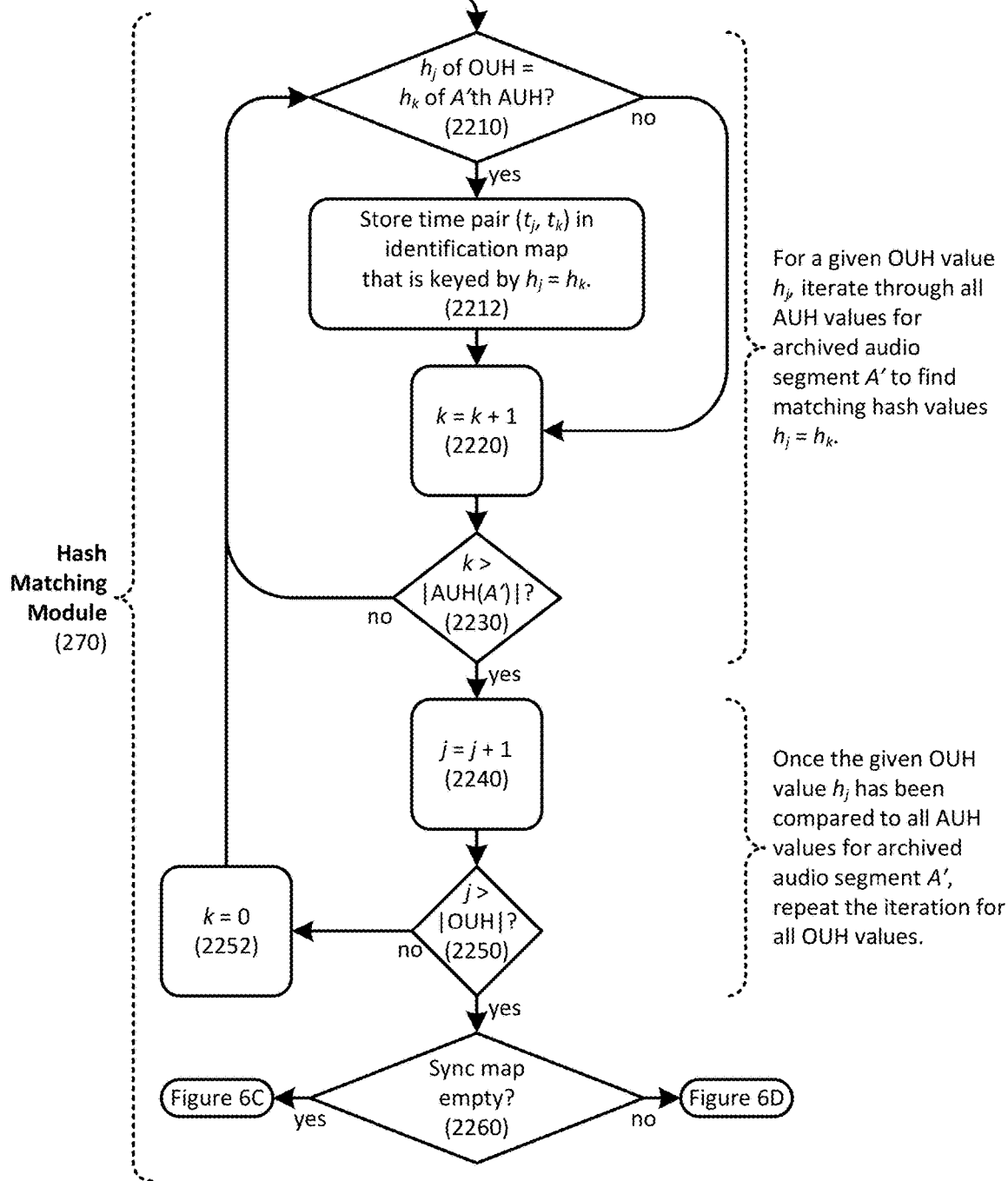
Figure 6C:
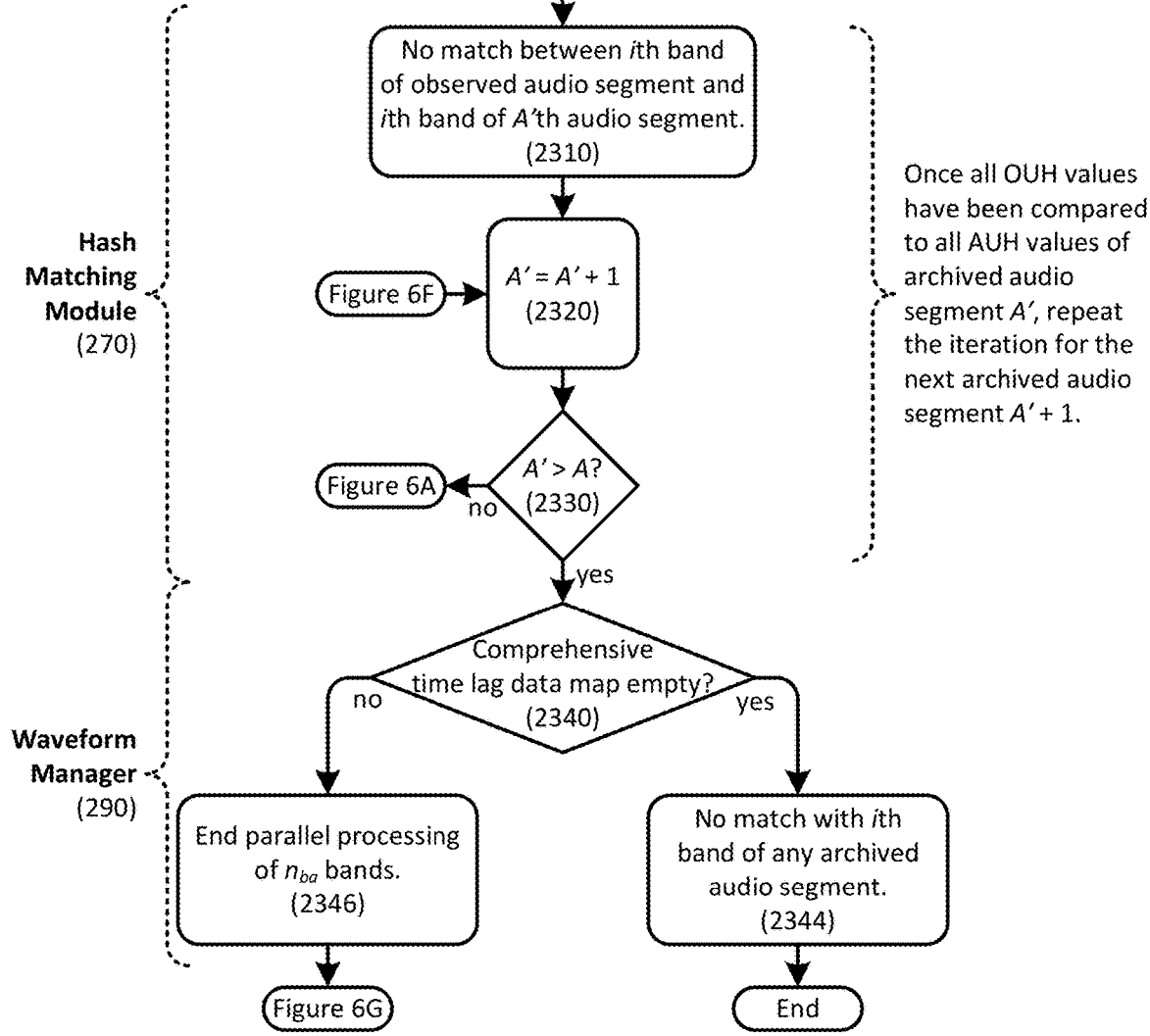
Figure 6D:
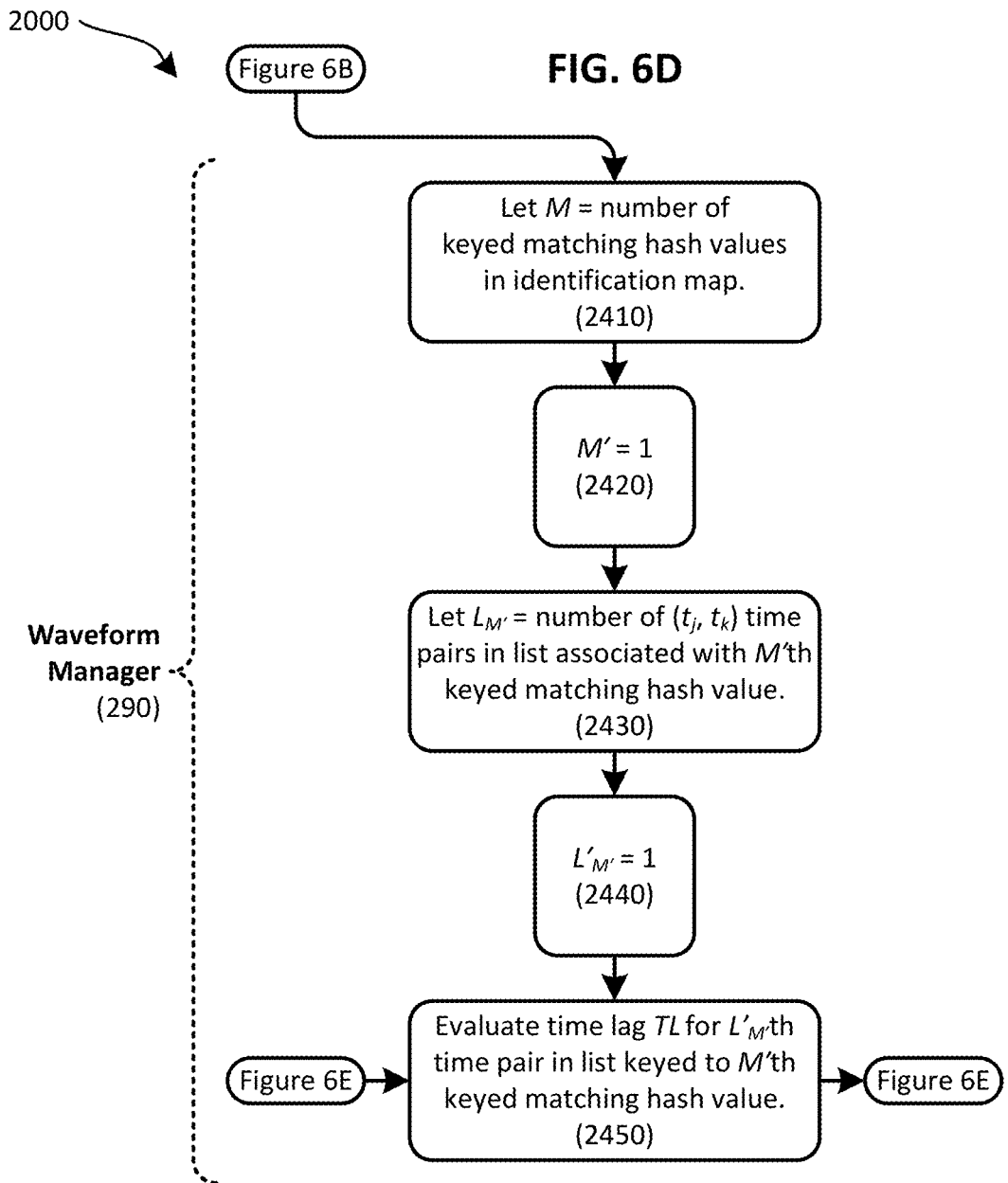
Figure 7:
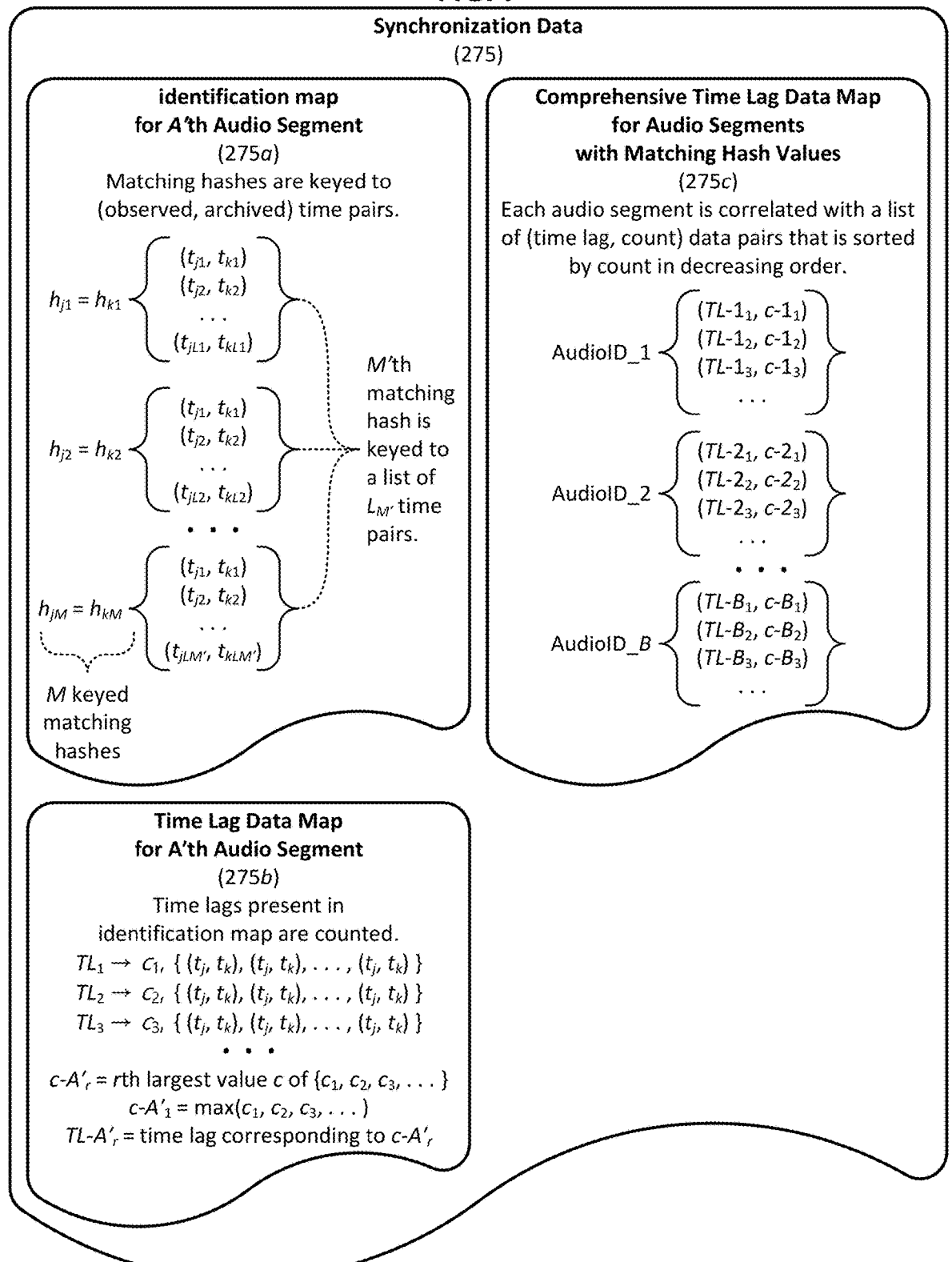
FIG. 7 conceptually illustrates certain data structures containing synchronization data which is used as part of the synchronization methodology illustrated in FIGS. 6A through 6G.
Figure 8:
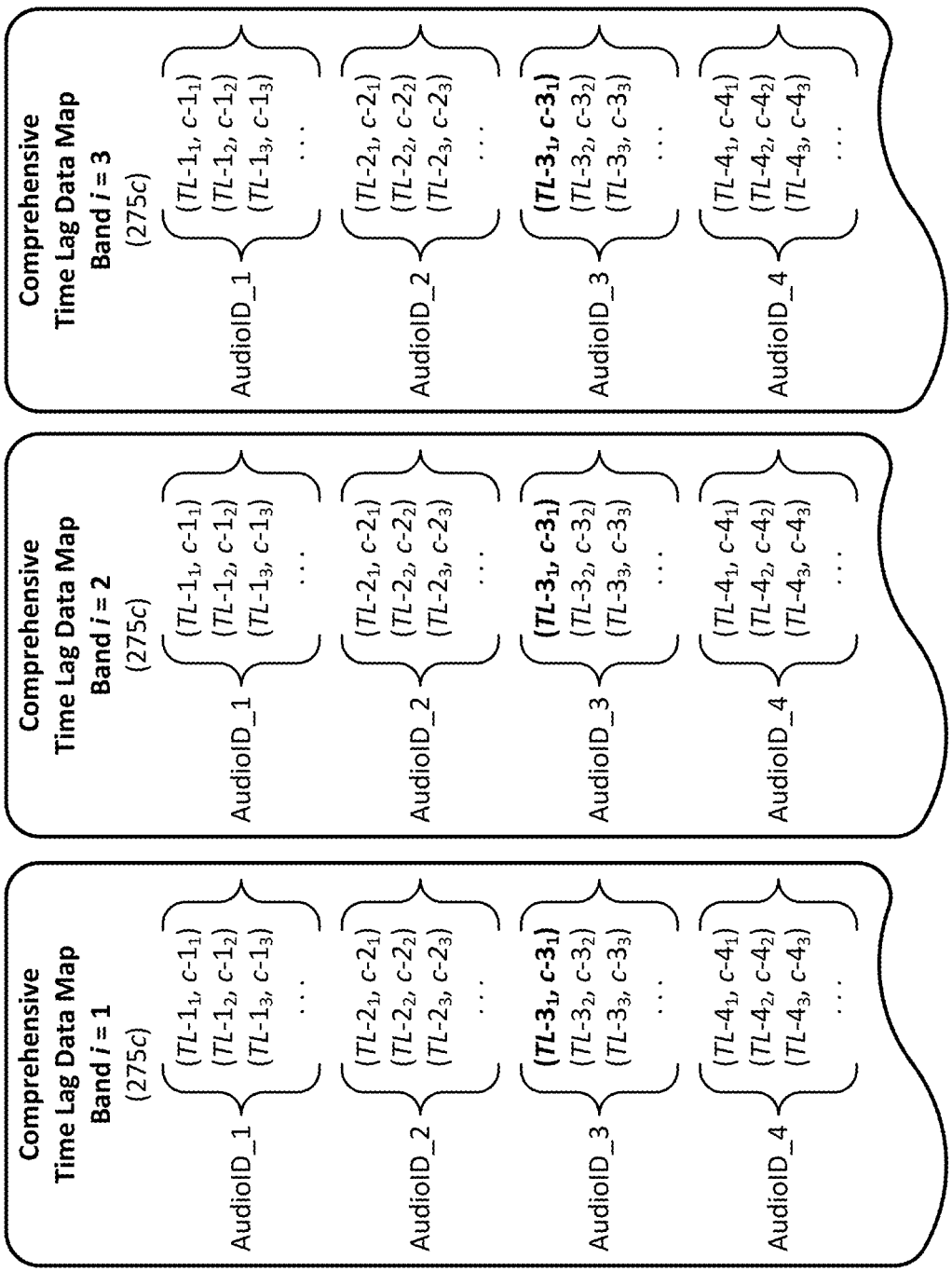
FIG. 8 conceptually illustrates a plurality of comprehensive time lag data maps produced by parallel processing a plurality of audio segment bands as part of the synchronization methodology illustrated in FIG. 6A through 6G.

Referring again to reference numeral 2260 in FIG. 6B, if synchronization map 275a is not empty, this indicates that at least one observed unique hash value matches at least one archived unique hash value. In this case, waveform manager 290 can be used to derive a time lag between the observed and archived audio segments based on the data provided in synchronization map 275a. To this end, M is defined as the number of keyed matching hash values contained in synchronization map 275a. See reference numeral 2140 in FIG. 6D. Matching hash value counting parameter M' is set such that M'=1. See reference numeral 2420 in FIG. 6D. Similarly, $L_{M'}$ is defined as the number of time pairs associated with the M'th keyed matching hash value. See reference numeral 2430 in FIG. 6D. Time pair counting parameter $L'_{M'}$ is set such that $L'_{M'}=1$. See reference numeral 2440 in FIG. 6D.

Figure 6E:
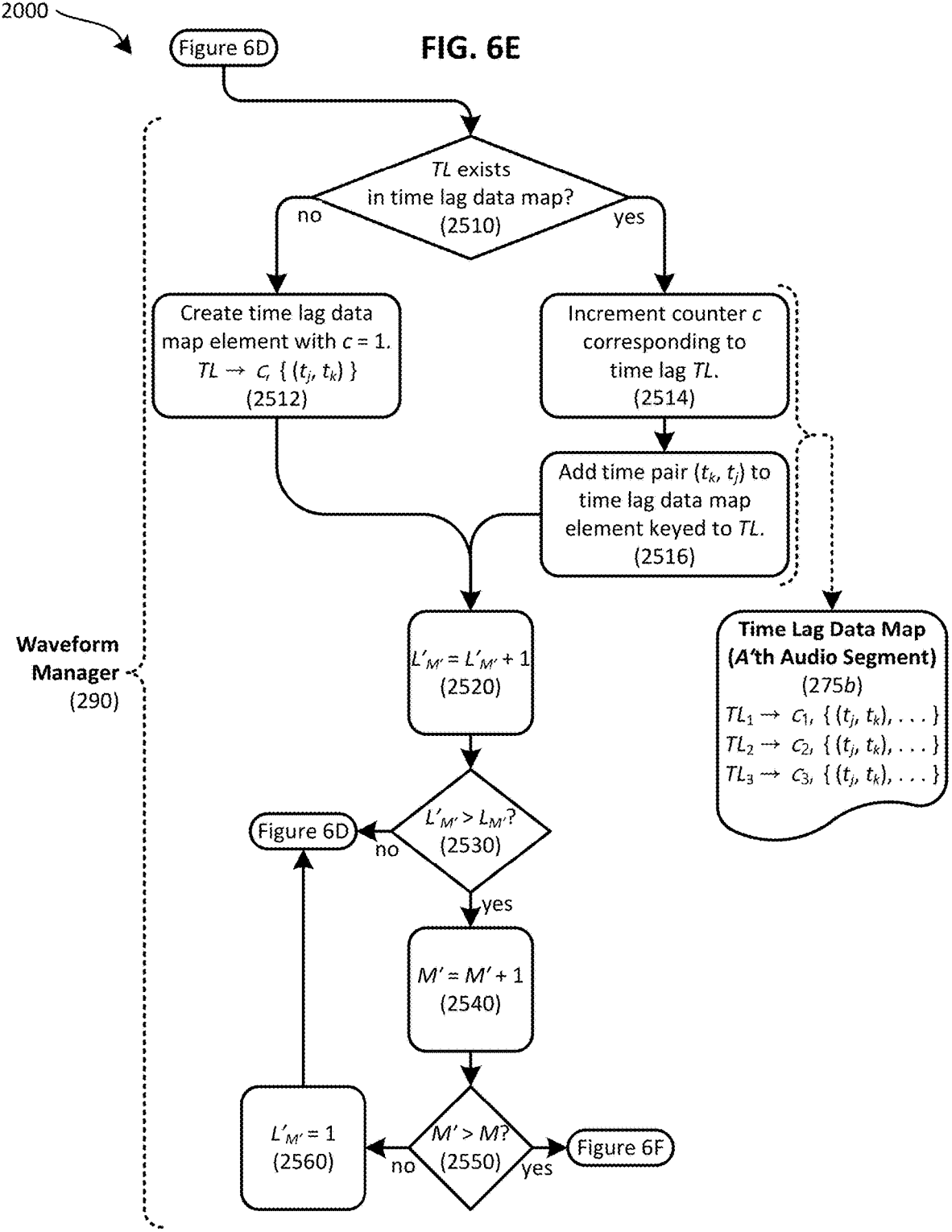

Once the counting parameters M' and $L'_{M'}$ are set, the time lag TL for the $L'_{M'}$th time pair in the list keyed to the M'th keyed matching hash value is evaluated. See reference numeral 2450 in FIG. 6D. For example, in one embodiment time lag TL is defined as the difference between the two time pairs ($t_j$, $t_k$), such that $TL=t_k-t_j$. Once TL is evaluated, it is determined whether TL exists in a time lag data map for A'th audio segment 275b. See reference numeral 2510 in FIG. 6E. As illustrated in FIGS. 6E and 7, time lag data map for A'th audio segment 275b can be understood as forming part of synchronization data 275 that is generated by waveform manager 290. More specifically, time lag data map for A'th audio segment 275b includes a listing of the time lag values $TL_1$, $TL_2$, $TL_3$, ..., each of which is keyed to (a) a listing of the time pairs that correspond to a given time lag TL, and (b) a count c of the number of time pairs in the listing. Thus, as illustrated in FIG. 6, time lag data map for A'th audio segment 275b can be understood as having a structure:

$$TL_1 \rightarrow c_1, \{(t_j, t_k), (t_j, t_k), \ldots, (t_j, t_k)\}$$

$$TL_2 \rightarrow c_2, \{(t_j, t_k), (t_j, t_k), \ldots, (t_j, t_k)\}$$

$$TL_3 \rightarrow c_3, \{(t_j, t_k), (t_j, t_k), \ldots, (t_j, t_k)\} \quad (6)$$

...

It will therefore be appreciated that because multiple time pairs may evaluate to the same time lag TL, a given time lag TL may be keyed to a plurality of time pairs.

If the evaluated time lag TL does not already exist in time lag data map for A'th audio segment 275b, a time lag data map element that corresponds to TL and that has a counter c=1 and a one-element list $\{(t_j, t_k)\}$ is created. See reference numeral 2512 in FIG. 6E. If, on the other hand, the evaluated time lag TL already exists in time lag data map for A'th audio segment 275b, the counter c corresponding to time lag TL is incremented. See reference numeral 2514 in FIG. 6E. The time pair $(t_j, t_k)$ is also added to the list corresponding to time lag $TL=t_k-t_j$. See reference numeral 2516 in FIG. 6E.

Regardless of whether or not the evaluated time lag TL already exists in time lag data map for A'th audio segment 275b, the time pair counting parameter $L'_{M'}$ is incremented by one. See reference numeral 2520 in FIG. 6E. Once the time pair counting parameter $L'_{M'}$ is incremented, it is determined whether all of the time pairs associated with the M'th keyed matching hash value have been converted to a time lag which has been indexed in time lag data map for A'th audio segment 275b. See reference numeral 2530 in FIG. 6E. In particular, if the incremented time pair counting parameter $L'_{M'}$ is less than or equal to the total number of time pairs associated with the M'th keyed matching hash value $L_{M'}$, then the time lag TL corresponding to the incremented $L'_{M'}$th time pair is evaluated. See reference numeral 2450 in FIG. 6D.

However, if the incremented time pair counting parameter $L'_{M'}$ is greater than the total number of time pairs associated with the M'th keyed matching hash value $L_{M'}$, this indicates that all of the time pairs associated with the M'th keyed matching hash value have been correlated with a time lag TL indexed in time lag data map for A'th audio segment 275b. In this case, the matching hash value counting parameter M' is incremented by one. See reference numeral 2540 in FIG. 6E. Once the matching hash value counting parameter M' is incremented, it is determined whether time pairs for all of the matching hash values have been correlated with corresponding time lags TL which are indexed in time lag data map for A'th audio segment 275b. See reference numeral 2550 in FIG. 6E. In particular, if the incremented matching hash value counting parameter M' is less than or equal to the total number of keyed matching hash values contained in synchronization map 275a, then the time pair counting parameter $L'_{M'}$ is reset such that $L'_{M'}=1$. See reference numeral 2560. The time lag TL for the first time pair of the M'th keyed matching hash value is then evaluated. See reference numeral 2450 in FIG. 6D.

On the other hand, if the incremented matching hash value counting parameter M' is greater than the total number of keyed matching hash values contained in synchronization map 275a, this indicates that all of the time pairs contained in synchronization map 275a have been correlated with a time lag TL indexed in time lag data map for A'th audio segment 275b. In this case time lag data map for A'th audio segment 275b is sorted by decreasing count c, such that the maximum count c-$A'_1$ is listed first. See reference numeral 2610 in FIG. 6F. In general, a count c-$A'_r$ can be understood as the rth largest value of $\{c_1, c_2, c_3, \ldots\}$ as listed in time lag data map for A'th audio segment 275b. Thus c-$A'_1$=max$(c_1, c_2, c_3, \ldots)$ for audio segment A'. Sorting the time lag data map for A'th audio segment allows the most frequently observed time lag for audio segment A' to be easily identified. In general, a time lag TL-$A'_r$ can be understood as the time lag associated with the count c-$A'_r$ as listed in time lag data map for A'th audio segment 275b. Thus TL-$A'_1$ is the most frequently observed time lag for audio segment A'.

Figure 6F:
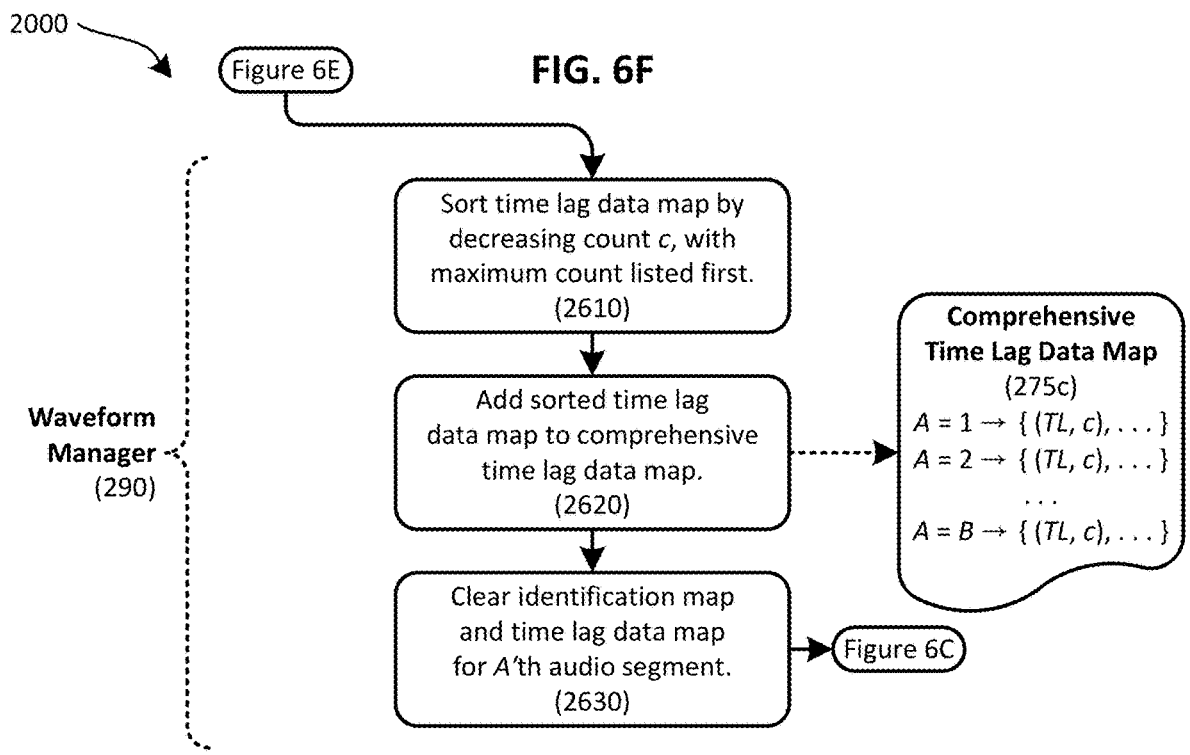
Figure 6G:
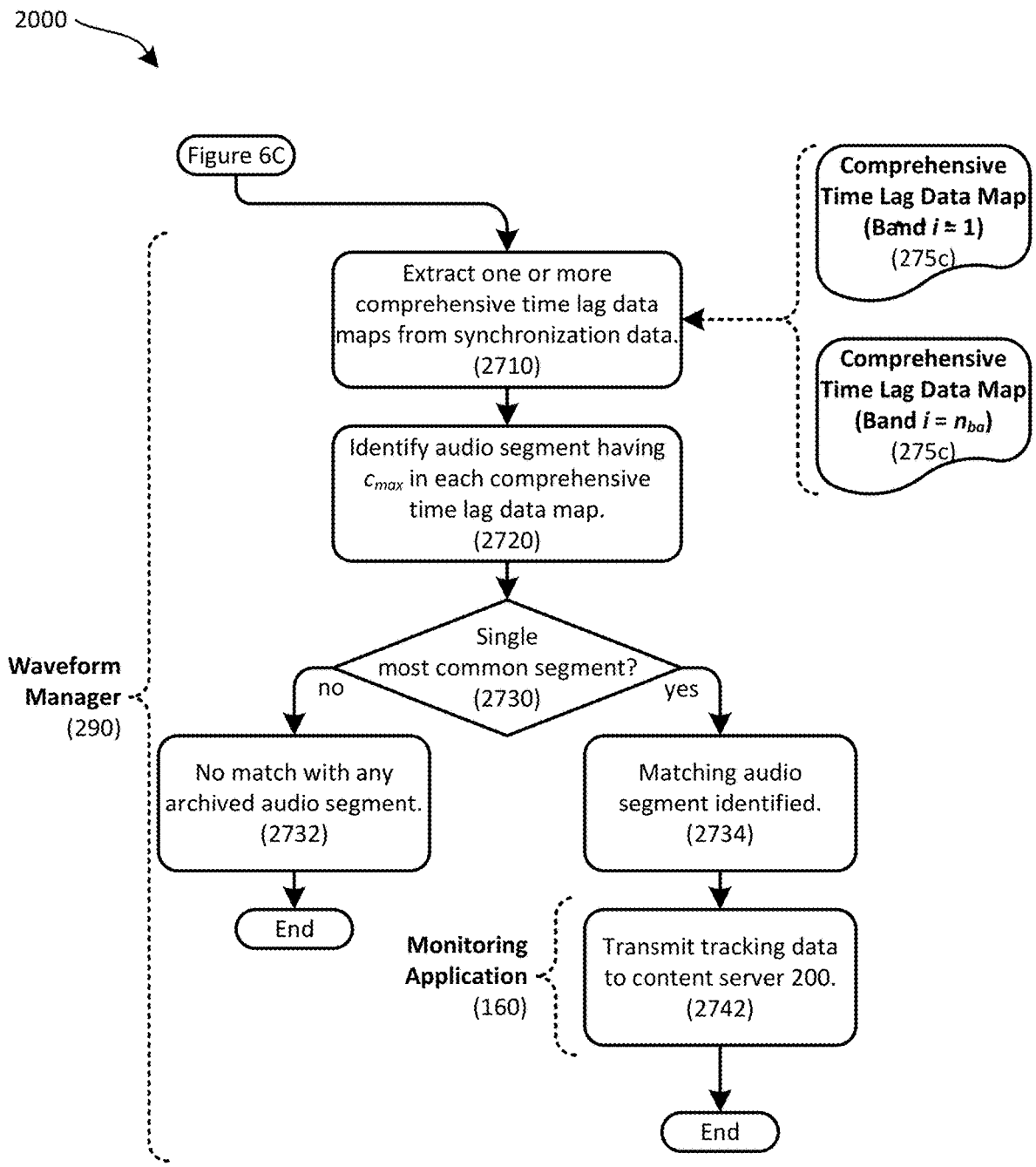

In certain embodiments, the sorted time lag data map for the A'th audio segment is added to a comprehensive time lag data map 275c. See reference numeral 2620 in FIG. 6F. As illustrated in FIGS. 6F and 7, comprehensive time lag data map 275c can be understood as forming part of synchronization data 275 that is generated by waveform manager 290. More specifically, comprehensive time lag data map 275c includes the sorted listing of (time lag, count) data pairs for B audio segments, where B is the number of audio segments having an archived unique hash value that matches an observed unique hash value. In other words, each of the B audio segments is keyed to a sorted list of (time lag, count) data pairs, thus allowing the most frequently observed time lag for each matching audio segment to be easily identified. Once the sorted time lag data map has been added to comprehensive time lag data map 275c, analysis of audio segment A' is considered compete. Thus, synchronization map 275a and time lag data map for A'th audio segment 275b, both of which only contain data specific to audio segment A', are cleared. See reference numeral 2630 in FIG. 6F. Audio segment counting parameter A' is then incremented by one. See reference numeral 2320 in FIG. 6C. Once the audio segment counting parameter A' is incremented, it is determined whether all of the archived audio segments have been compared to the observed audio segment. See reference numeral 2330 in FIG. 6B. In particular, if the incremented audio segment counting parameter A' is less than or equal to the total quantity of archived audio segments A, then the archived unique hash for the ith frequency band of the incremented A'th audio segment is retrieved. See reference numeral 2160 in FIG. 6A. Processing of the incremented A'th audio segment follows as described herein.

On the other hand, if the incremented audio segment counting parameter A' is greater than the total quantity of archived audio segments A, this indicates that the ith band of all A archived audio segments has been compared to the ith band of the observed audio segment. The results of these comparisons are provided in comprehensive time lag data map 275c. Waveform manager 290 can be configured to determine whether comprehensive time lag data map 275c is empty. See reference numeral 2340 in FIG. 6C. If this is the case, the ith band of the observed audio segment did not match the ith band of any archived audio segment. See reference numeral 2344 in FIG. 6C. In this case, the ith band of the observed audio segment is not subjected to further processing.

However, if comprehensive time lag data map 275c is not empty and contains (time lag, count) data pairs for each of the archived audio segments B having matching hash values, then waveform manager 290 is configured to end parallel processing of the $n_{ba}$ bands. See reference numeral 2346 in FIG. 6C. Taken as a whole, this parallel processing will produce anywhere from one to $n_{ba}$ comprehensive time lag data maps 275c for the $n_{ba}$ bands of the observed audio segment. In some cases, fewer than $n_{ba}$ comprehensive time lag data maps will be generated, such as where one or more of the bands does not produce any matches between the observed and archived audio segments. When the parallel processing of the $n_{ba}$ bands is complete, waveform manager is configured to extract the one or more comprehensive time lag data maps 275c from synchronization data 275. See reference numeral 2710 in FIG. 6G.

FIG. 7 illustrates examples of comprehensive time lag data maps 275c which may be extracted from synchronization data 275. Each comprehensive time lag data map 275c is associated with one of the $n_{ba}$ bands subjected to parallel processing as described herein. In addition, each comprehensive time lag data map 275c includes a sorted listing of (time lag, count) data pairs for each of the B audio segments having an archived unique hash value that matches an observed unique hash value. For instance, B=4 in the example embodiment illustrated in FIG. 7, and therefore each comprehensive time lag data map 275c includes four sorted listings of (time lag, count) data pairs. The first data pair included in each sorted list will be associated with the maximum count c-B'$_1$, wherein 1≤B'≤B.

In certain embodiments, the audio segment associated with the maximum count $c_{max}$ present in a given comprehensive time lag data map 275c is identified. See reference numeral 2720 in FIG. 6G. This audio segment, which may also be referred to as the "most common" audio segment, can be identified by determining $c_{max}$=max(c-1$_1$, c-2$_1$, c-3$_1$, . . . , c-B$_1$). In the example embodiment illustrated in FIG. 8, where B=4, $c_{max}$=max(c-1$_1$, c-2$_1$, c-3$_1$, c-4$_1$)=c-3$_1$ for each of the $n_{ba}$ bands under analysis. Thus, count c-3$_1$ and its corresponding time lag TL−3 are indicated in boldface in FIG. 8. Audio segment 3 is thus identified as being the most common audio segment in this particular example. Each analyzed band may or may not identify the same most common audio segment as being associated with $c_{max}$. Thus, once the most common audio segment is identified for each of the analyzed bands, it is determined whether all of the bands identify the same audio segment as being most common. See reference numeral 2730 in FIG. 6G. It will be appreciated that in alternative embodiments, this determination can be modified such that a majority or a predetermined threshold portion of the bands identify the same audio segment as being most common.

Where different bands identify different audio segments as being most common, it may not be possible to match the observed audio segment with an archived audio segment with a threshold confidence level. See reference numeral 2732. In this case, the analysis ends without identifying a matching archived audio segment, although a user may wish to repeat the analysis with a longer observed audio segment. Thus, in some cases monitoring application 200 is configured to process additional observed audio data in response to a detected failure to identify a matching archived audio segment. On the other hand, where all of the bands identify the same archived audio segment as being most common, or in alternative embodiments where a majority or a threshold plurality of the bands identify a particular audio segment as being most common, the identified most common audio segment can be considered a positive match with the observed audio segment. See reference numeral 2734 in FIG. 6G.

Once an archived audio segment is identified as a positive match to the observed audio segment, the monitoring application 160 transmits tracking data 410 to the content server 200 via the network 300, thereby signaling the content server 200 that the client computing device 200 has detected broadcast content 500. In some embodiments, in response to identifying a positive match, monitoring application 160 is further configured to attempt identify another positive match at a later time within the duration of the broadcast content. In these embodiments, the monitoring application 160 delays transmission of tracking data 410 until a second positive match is made. This embodiment enables the monitoring application 160 to verify that a user of the client computing device was exposed to a substantial portion of the broadcast content, which may indicate that the broadcast content was relevant to the user.

Content Management Interface

Figure 9:
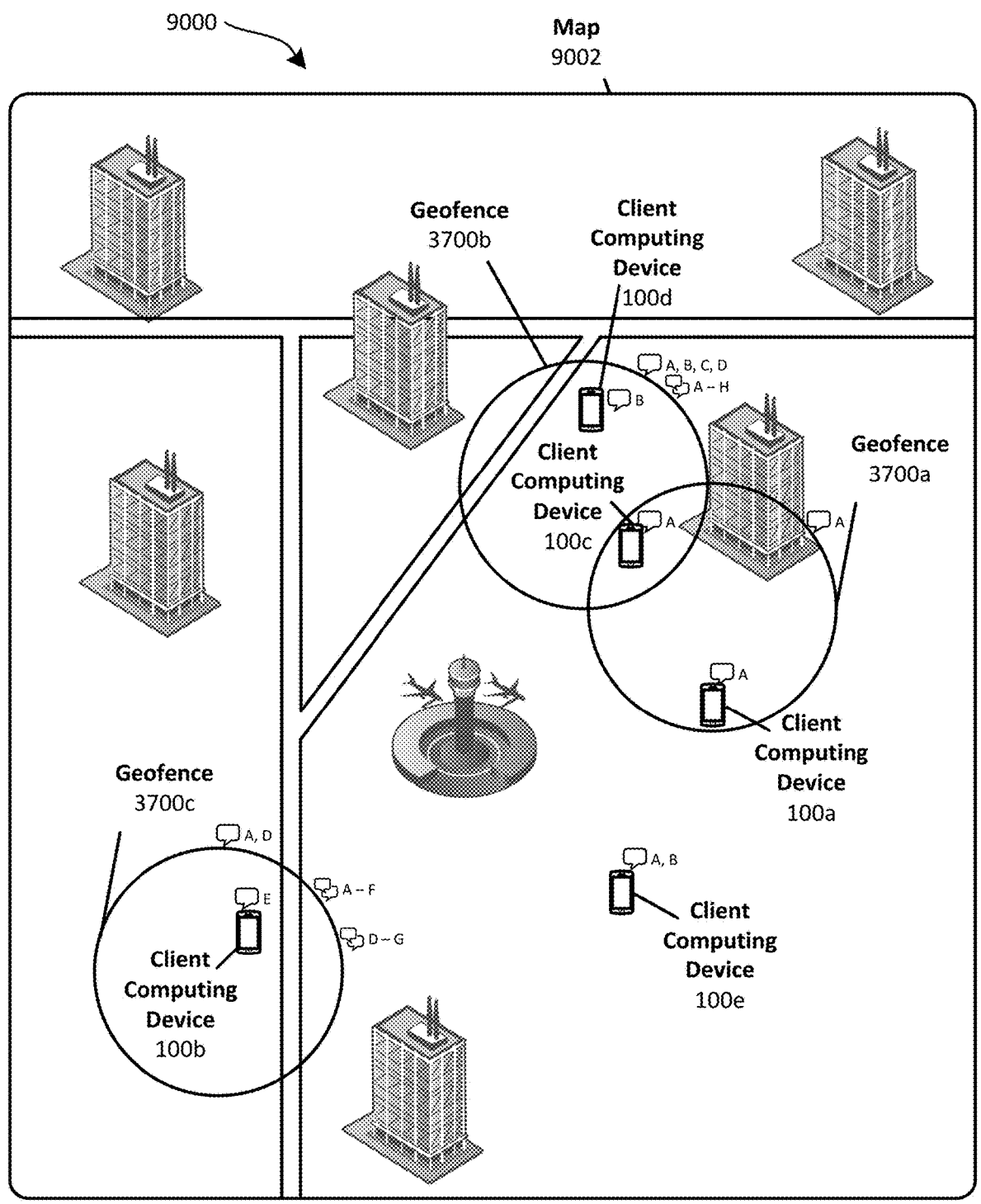
FIG. 9 is a pictorial representation of a user interface screen that tracks broadcast content delivery in accordance with certain of the embodiments disclosed herein.

FIG. 9 illustrates a screen 9000 presented by user interface 288 served by the content server 200 described above. Screen 9000 is configured to present tracking data and to receive input regarding the tracking data, geofences, content groups, and distribution rules. As shown, screen 9000 includes a map 9002 depicting a geographic area over which broadcast content is distributed. Screen 9000 includes elements depicting streets, buildings, and other facilities. Screen 9000 also includes elements depicting geofences 3700a, 3700b, and 3700c and client computing devices 100a, 100b, 100c, 100d, and 100e.

Client computing devices 100a, 100b, 100c, 100d, and 100e each represent a reception of broadcast content transmitted to the content server 200 within tracking data. The broadcast content received by each of client computing devices 100a, 100b, 100c, 100d, and 100e is indicated by a bubble associated with each respective client computing device. Additionally, the position of each of client computing devices 100a, 100b, 100c, 100d, and 100e on the map 9002 indicates the location of the client computing devices when the broadcast content was received. As shown in FIG. 9 client computing device 100a received broadcast content A while located in geofence 3700a. Client computing device 100b received broadcast content E while located in geofence 3700c. Client computing device 100c received broadcast content A while located in both geofence 3700a and geofence 3700b. Client computing device 100d received broadcast content B while located in geofence 3700b. Client computing devices 100e received broadcast content A and broadcast content B outside of any defined geofence.

Geofences 3700a, 3700b, and 3700c each represent a geographic area of interest to a user of the content server 200. For example, each of geofences 3700a, 3700b, and 3700c may include a facility relevant to particular broadcast content, such as a store or other retail establishment. The position of each of the geofences 3700a, 3700b, and 3700c on the map 9002 indicates is location in the overall geographic area depicted. The bubble associated with each respective geofence indicates broadcast content (e.g., an element of broadcast content included in a content group) associated with the geofence. As shown in FIG. 9, geofence 3700a is associated with broadcast content A; geofence 3700b is associated with broadcast content A, B, C, and D; and geofence 3700c is associated with broadcast content A and D.

In some embodiments, the associations between geofences and broadcast content are indicative of distribution rules that are associated with the geofences and/or the broadcast content. More specifically, in some embodiments, each geofence associated with broadcast media is also associated with a distribution rule specific to the broadcast media and the geofence. As shown in FIG. 9, geofence 3700a is associated with a distribution rule associated with broadcast content A; geofence 3700b is associated with distinct distribution rules associated with broadcast content A, B, C, and D; and geofence 3700c is associated with distinct distribution rules associated with broadcast content A and broadcast content D.

As explained above, distribution rules govern the transmission of supplemental content to client computing devices. More specifically, in some embodiments, supplemental content identified in a distribution rule is transmitted to a client computing device where the client computing device receives broadcast content identified in the distribution rule and where the client computing device is located within a geofence identified in the distribution rule. As shown in FIG. 9, the conversation bubbles associated with geofences 3700b and 3700c indicate that distribution rules associated with those geofences will, when applied by content server 200, cause content server 200 to transmit supplemental content to devices. More specifically, the distribution rule associated with geofence 3700b will cause content server 200 to transmit supplemental content H to any device receiving broadcast content A within the geofence 3700b. Similarly, the distribution rules associated with geofence 3700c will cause content server 200 to transmit supplemental content F to any device receiving broadcast content A within the geofence 3700c and will cause content server 200 to transmit supplemental content G to any device receiving broadcast content D within the geofence 3700c.

In some embodiments, the content server 200 will operate as follows when configured as illustrated in FIG. 9 and when encountering tracking data as illustrated in FIG. 9. The content server 200 will broadcast no supplemental content to client computing device 100e because client computing device 100e is located outside all of geofences 3700a, 3700b, and 3700c. The content server 200 will broadcast no supplemental content to client computing device 100a because while client computing device 100a is located within geofence 3700a, no distribution rules associated with geofence 3700a exist. The content server 200 will broadcast no supplemental content to client computing device 100b because while client computing device 100b is located within geofence 3700c, client computing device 100b received broadcast content E. As indicated, the distribution rules associated with geofence 3700c are also associated with broadcast content A and broadcast content D. Thus, no distribution rule associated with geofence 3700c is associated with broadcast content E and, therefore, reception of broadcast content E within geofence 3700 does not result in transmission of supplemental content. The content server will, however, transmit supplemental content H to client computing device 100c because client computing device 100c received broadcast content A while located within the geofence 3700b and geofence 3700b is associated with a distribution rule that is also associated with broadcast content A and supplemental content H.

In some embodiments, the user interface 288 is configured to receive input specifying the creation, deletion, or modification of geofences. When executing according to this configuration in some embodiments, user interface 288 responds to an actuation (e.g., a mouse click or a touch) on an open area of the map 9200 by creating a geofence centered on the mouse click or touch. In these embodiments, user interface 288 responds to a selection of an existing geofence by displaying elements configured to receive input for modifying characteristics of the selected geofence. These characteristics may include boundaries of the selected geofence and broadcast content associated with the selected geofence. In some embodiments, user interface 288 responds to a selection of an existing association between a geofence and broadcast content (e.g., as indicated by the bubbles in screen 9000) by displaying elements configured to receive input for modifying characteristics of the selected association. These characteristics may include broadcast content associated with the geofence and supplemental content associated with the broadcast content and the geofence. Where an association between the geofence, broadcast content, and supplemental content is established, the user interface 288 also creates a distribution rule associated with the geofence, the broadcast content, and the supplemental content.

Additionally, in some embodiments, the user interface 288 is configured to periodically, or on demand (e.g., when the user interface 288 is executed), scan a tracking data repository (e.g., the tracking data repository 282) to generate reception counts by geofence and/or by broadcast content received. When executing according to this configuration in some embodiments, the user interface 288 determines that a client computing device received an observed audio segment while the client computing device was located with a geofence by comparing the location stored in the tracking data to the boundaries of the geofence. In this situation, the user interface 288 increments a reception counter associated with the geofence and/or the broadcast content where the archived audio segment stored in the tracking data was derived from, and associated with, the broadcast content. In some embodiments, the user interface 288 is configured to generate (or regenerate) reception counts for a configurable, user-identified time period.

As shown in FIG. 9, broadcast content A, B, C, and D are each member of a content group. In some embodiments, user interface 288 responds to a request to modify a content group by displaying elements configured to receive input for modifying characteristics of the content group. This request may, for example, be actuation of a shift key of a keyboard in combination with a mouse click while the mouse cursor is positioned over a bubble. The characteristics of the content group that may be modified include addition and deletion of members.

In some embodiments, user interface 288 is configure to receive supplemental content in the form of follow-up advertisements. Follow-up advertisements may specify group deals that provide benefits (e.g., discounts) if unlocked by, for example, a minimum number of participants accepting the deal. Follow-up advertisements may be particularly relevant to users located within a geofence that includes a retail location at which the products or services referenced in the advertisement are available. In some embodiments, follow-up advertisements may specify both the number of participants required to unlock a group deal and the number of participants who have indicated they are willing to participate. The content server 200 may include links or other executable elements within or in association with the supplemental content to facilitate responses from participants. A response may indicate that a user wishes to participate in a group deal.

Methodology: Cluster Building

Figure 10:
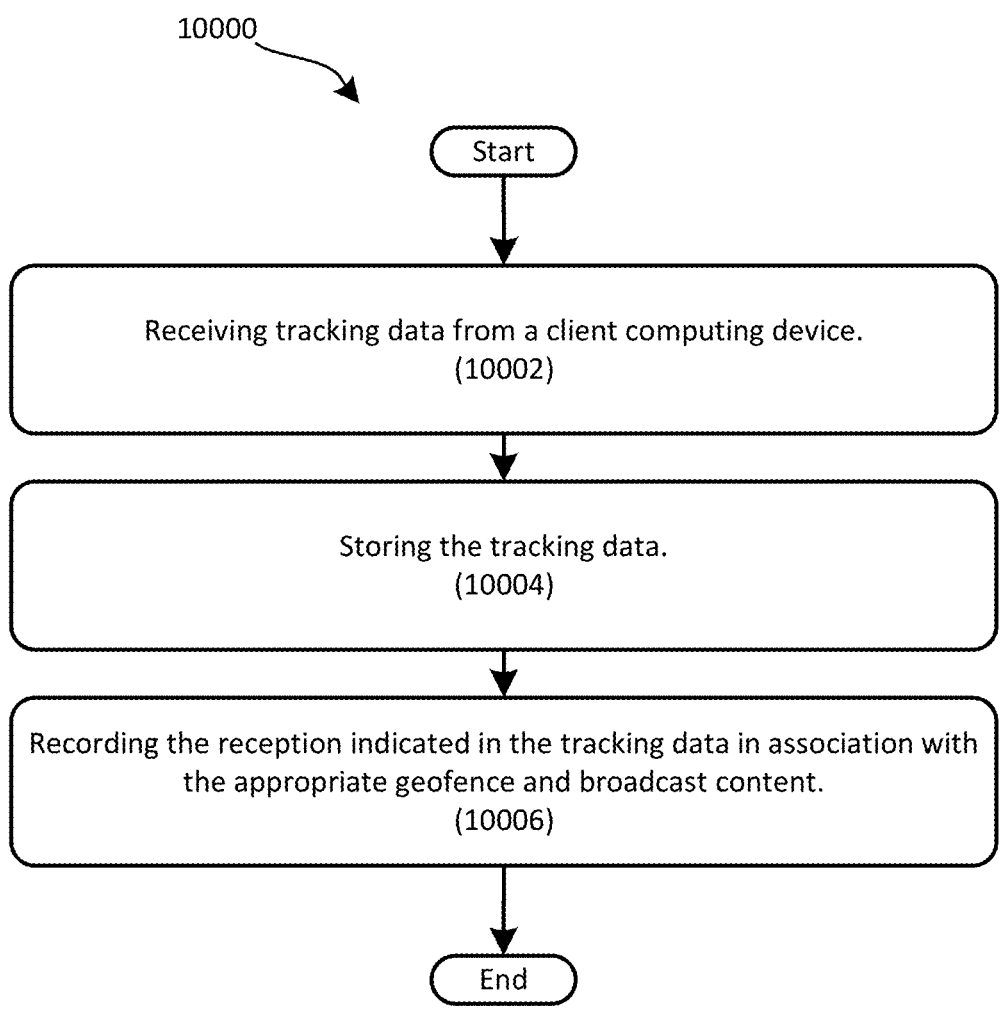
FIG. 10 is a flowchart illustrating an example method for generating data displayed in the user interface screen of FIG. 11.
Figure 11:
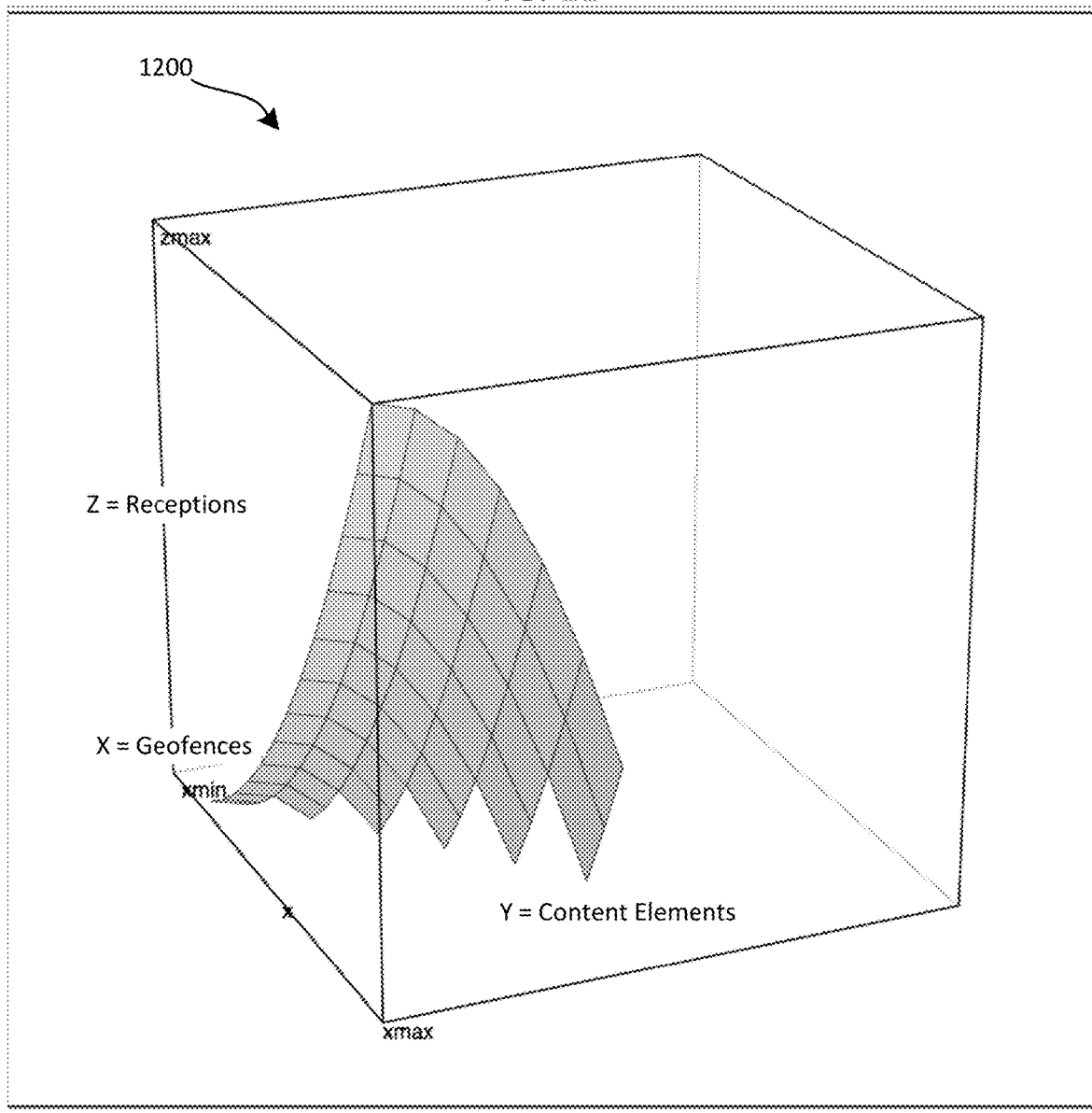
FIG. 11 is a pictorial representation of a user interface screen that tracks broadcast content delivery by geographic area and broadcast area in accordance with certain of the embodiments disclosed herein.

In some embodiments, the content server 200 is configured to process tracking data to create historical intensity distributions of receptions of broadcast content. FIG. 10 illustrates a clustering method 10000 executed in these embodiments. Method 10000 commences with receiving tracking data from a client computing device. See reference numeral 10002 in FIG. 10 as well as FIGS. 2A and 2B, which illustrate transmission of tracking data 410 by client computing device 100 and receipt of tracking data 410 by content server 200. Method 10000 continues with storing the tracking data. See reference numeral 10004 in FIG. 10 as well as FIGS. 2A and 2B, which illustrate tracking data 410 being received by content server 200 and being stored in tracking data repository 282. Method 10000 continues with recording the reception of broadcast content indicated in the tracking data in association with the appropriate geofence and broadcast content. See reference numeral 10006. For example, where the tracking data indicates receipt within a geofence by the client computing device of broadcast content associated with the geofence, this step of the method 10000 increments a counter of the number of receptions of the broadcast content received within the geofence. In some embodiments, the step 10006 is executed by user interface 288. In some embodiments, method 10000 is executed many times each day (e.g., once for each element of tracking data received). In these embodiments, the cluster day generated by method 10000 is allowed to accumulate to enable historically accurate reporting on the intensity of receptions of broadcast content. FIG. 12 illustrates an intensity distribution graph rendered by user interface 288 in accordance with some embodiments. In the intensity distribution graph illustrates the number of receptions on the z-axis, the number of geofences on the x-axis, and the number of distinct elements of content on the y-axis.

CONCLUSION

FIG. 13 is a flowchart illustrating an example method 3000 for tracking and managing content delivery via audio cues. Method 3000 commences with receiving an observed audio segment at client computing device. See reference numeral 3100 in FIG. 13, as well as FIG. 2A, which illustrates that client computing device 100 can be understood as receiving an observed audio signal 400, such as ambient sound provided by a radio broadcast, a music performance, or some other audio source. Method 3000 continues with generating a plurality of hash values corresponding to the observed audio segment. See reference numeral 3200 in FIG. 13, as well as FIGS. 2A and 2B, which illustrate an example method for generating unique hash data based on an observed audio signal. Method 3000 continues with performing a comparison of each of the plurality of hash values to a plurality of archived hash values, wherein each of the plurality of archived hash values is associated with one of a plurality of archived audio segments. See reference numeral 3300 in FIG. 13, as well as reference numeral 2210 in FIG. 6B, wherein the jth hash value of the observed unique hash ($h_j$) is compared to the kth hash value of the archived unique hash that is associated with the A'th archived audio segment ($h_k$). Method 3000 continues with transmitting tracking data to a content server. See reference numeral 3400 in FIG. 13, as well as FIGS. 2A and 2B, which illustrate tracking data 410 being received by content server 200 and being stored in tracking data repository 282. Method 3000 continues with identifying applicable distribution rules. See reference numeral 3500 in FIG. 13, as well as FIG. 2B and its associated description, wherein content manager 280 searches distribution rules repository 284 for applicable distribution rules. Method 3000 continues with recording receptions in clusters and transmitting supplemental content. See reference numeral 3600 in FIG. 13, as well as reference numeral 10006 in FIG. 10 and FIG. 2B which illustrates content manager 280 transmitting supplemental content 505 to client computing device 100 via network 300.

In one embodiment, a method for managing content delivery is provided. The method includes acts of receiving an observed audio segment at a client computing device; generating a plurality of hash values corresponding to the observed audio segment; performing a comparison of each of the plurality of hash values to a plurality of archived hash values, wherein each of the plurality of archived hash values is associated with one of a plurality of archived audio segments; identifying a selected archived audio segment of broadcast content based on the comparison, wherein at least a portion of the selected archived audio segment corresponds to the observed audio segment; and transmitting tracking data to a content server remote from the client computing device in response to identifying the selected archived audio segment, the tracking data including an identifier of the selected archived audio segment and an identifier of a geographic location of the client computing device.

The method may further comprise acts of receiving the tracking data at the content server; identifying a geographic area associated with the broadcast content; determining that the client computing device received the observed audio segment while the client computing device was located in the geographic area by comparing the geographic area with the geographic location of the client computing device included in the tracking data; identifying supplemental content associated with the broadcast content and the geographic area; and transmitting the supplemental content to the client computing device. In the method, the act of transmitting the supplemental content may include and act of transmitting a link actuatable to respond to the supplemental content. In the method, the act of transmitting the supplemental content may include an act of transmitting an indication of a number of received responses to the supplemental content.

The method may further comprise acts of receiving the tracking data at the content server; identifying a geographic area associated with the selected archived audio segment; determining that the client computing device received the observed audio segment while the client computing device was located in the geographic area by comparing the geographic area to the geographic location of the client computing device included in the tracking data; incrementing a reception count associated with the geographic area and the broadcast content; and displaying the reception count via a user interface. In the method, the act of identifying the geographic area may include an act of identifying a geofence specifying a user-defined area.

The method may further include an act of receiving, via a user interface, input identifying one or more boundaries of the geofence, the one or more boundaries including at least one of a user-identified street, block, city, zip code, state, and country. The method may further include act of displaying a representation of the geofence overlaid upon a map. The method may further include an acts of receiving tracking data at the content server from a plurality client computing devices, the tracking data including identifiers of selected archived audio segments of additional broadcast content and identifiers of geographic locations of the plurality of client computing devices; identifying one or more geographic areas associated with the selected archived audio segments; determining that the plurality of client computing devices received observed audio segments of the additional broadcast content while the plurality of client computing devices were located in the one or more geographic areas by comparing the one or more geographic areas to geographic locations of the plurality of client computing devices included in the tracking data; incrementing one or more reception counts associated with the one or more geographic areas and the selected archived audio segments of the additional broadcast content; and displaying the one or more reception counts via a user interface.

In the method, the act of generating the plurality of hash values corresponding to the observed audio segment may further include acts of dividing a frequency spectrum of the observed audio segment into a frequency band between 300 Hz and 3000 Hz; dividing the frequency bands into five bin subsets; identifying a bin index corresponding to a maximum power in each of the five bin subsets; and generating a plurality of hash values over a duration of the observed audio segment based on the bin indices.

In another embodiment, a system for content management is provided. The system includes an archived content processing module that is configured to receive broadcast content that includes audio content and video content, wherein the archived content processing module further includes an archived content hashing sub-module configured to generate archived unique hash data based on the audio content; an observed content processing module that is configured to receive an observed audio segment at a client computing device, and that includes an observed content hashing sub-module configured to generate observed unique hash data based on the observed audio segment; a memory configured to store a comprehensive time lag data map that correlates a plurality of archived audio segments with a list of (time lag, count) data pairs, wherein the time lag is based on a comparison of the archived unique hash data and the observed unique hash data, and wherein the count is based on a frequency of the paired time lag; and a waveform manager that is configured to (a) identify a matching archived audio segment that corresponds to the observed audio segment based on a maximum count identified from the comprehensive time lag data map, and (b) transmit tracking data to a content server remote from the client computing device.

The system may further include a content manager that is configured to (a) receive the tracking data, (b) identify a geographic area associated with the broadcast content, (c) determine that the client computing device received the observed audio segment while the client computing device was located in the geographic area by comparing the geographic area with the geographic location of the client computing device included in the tracking data, (d) identify supplemental content associated with the broadcast content and the geographic area, and (e) transmit the supplemental content to the client computing device. In the system, the content manager may be configured to identify the geographic area at least in part by identifying a geofence specifying a user-defined area.

In the system, the supplemental content may include a link actuatable to respond to the supplemental content. The system may further include a content manager that is configured to (a) receive the tracking data, (b) identify a geographic area associated with the broadcast content, (c) determine that the client computing device received the observed audio segment while the client computing device was located in the geographic area by comparing the geographic area with the geographic location of the client computing device included in the tracking data, (d) increment a reception count associated with the geographic area and the broadcast content, and (e) display the reception count via a user interface. In the system, the observed content hashing sub-module may be further configured to: divide a frequency spectrum of the observed audio segment into a frequency band between 300 Hz and 3000 Hz; divide the frequency bands into five bin subsets; identify a bin index corresponding to a maximum power in each of the five bin subsets; and generate a plurality of hash values over a duration of the observed audio segment based on the bin indices.

In another embodiment, a computer program product encoded with instructions is provided. The instructions, when executed by one or more processors, cause a process for managing content to be carried out. The process includes acts of receiving an observed audio segment at a client computing device; identifying an archived audio segment of broadcast content that includes at least a portion of the observed audio segment based on a plurality of hash values corresponding to the archived audio segment and a plurality of hash values corresponding to the observed audio segment; and transmitting tracking data to a content server remote from the client computing device in response to identifying the archived audio segment, the tracking data including an identifier of the archived audio segment and an identifier of a geographic location of the client computing device. The process may further comprise an act of receiving supplemental content associated with the broadcast content and a geographic area including the geographic location. The geographic area may include a user-defined area. The act of identifying the archived audio segment may further include acts of generating a plurality of hash values corresponding to the observed audio segment and performing a comparison of each of the plurality of hash values to a plurality of archived hash values, wherein each of the plurality of archived hash values is associated with one of a plurality of archived audio segments.

The foregoing detailed description has been presented for illustration. It is not intended to be exhaustive or to limit the disclosure to the precise form described. Many modifications and variations are possible in light of this disclosure. Therefore it is intended that the scope of the disclosure be limited not by this detailed description, but rather by the claims appended hereto. Subsequently filed applications claiming priority to this application may claim the disclosed subject matter in a different manner, and may generally include any set of one or more features as variously disclosed or otherwise demonstrated herein.

What is claimed is:

1. A method for managing content delivery, the method comprising:
 receiving an observed audio segment at a client computing device;
 generating a plurality of hash values corresponding to the observed audio segment;
 performing a comparison of each of the plurality of hash values to a plurality of archived hash values, wherein each of the plurality of archived hash values is associated with one of a plurality of archived audio segments, and wherein each of the plurality of archived hash values is archived at the client computing device;
 identifying a selected archived audio segment of broadcast content based on the comparison, wherein at least a portion of the selected archived audio segment corresponds to the observed audio segment;
 transmitting tracking data from the client computing device to a content server remote from the client computing device in response to identifying the selected archived audio segment, the tracking data including an identifier of the selected archived audio segment and an identifier of a geographic location of the client computing device; and receiving, at the client computing device, from the content server, (a) supplemental content that is associated with the broadcast content and that is also associated with a geographic area that encompasses the geographic location of the client computing device, and (b) an indication of a number of responses that the content server received in response to the content server sending the supplemental content.

2. The method of claim 1, further comprising:
receiving the tracking data at the content server;
identifying the geographic area associated with the broadcast content;
making a determination that the geographic location received from the client computing device is within the identified geographic area; and
in response to making the determination, transmitting the supplemental content from the content server to the client computing device.

3. The method of claim 2, wherein transmitting the supplemental content includes transmitting a link actuatable to respond to the supplemental content.

4. The method of claim 1, further comprising identifying, by the content server, the supplemental content based on the tracking data received from the client computing device.

5. The method of claim 1, further comprising:
receiving the tracking data at the content server;
identifying the geographic area associated with the selected archived audio segment;
making a determination that the geographic location received from the client computing device is within the identified geographic area;
incrementing a reception count associated with the geographic area and the broadcast content; and
displaying the reception count via a user interface.

6. The method of claim 2, wherein identifying the geographic area includes identifying a geofence specifying a user-defined area.

7. The method of claim 6, further comprising receiving, via a user interface, input identifying one or more boundaries of the geofence, the one or more boundaries including at least one of a user-identified street, block, city, zip code, state, and country.

8. The method of claim 7, further comprising displaying a representation of the geofence overlaid upon a map.

9. The method of claim 1, further comprising:
receiving the tracking data at the content server;
identifying the geographic area associated with the selected archived audio segment;
making a determination that the geographic location received from the client computing device is within the identified geographic area;
incrementing a reception count associated with the geographic area and the broadcast content; and
displaying the reception count via a user interface provided at the content server.

10. The method of claim 1, wherein generating the plurality of hash values corresponding to the observed audio segment further comprises:
dividing a frequency spectrum of the observed audio segment into a frequency band between 300 Hz and 3000 Hz;
dividing the frequency band into five bin subsets;
identifying a bin index corresponding to a maximum power in each of the five bin subsets; and
generating the plurality of hash values over a duration of the observed audio segment based on the bin indices.

11. A computer program product encoded with instructions that, when executed by one or more processors, cause a process for managing content to be carried out, the process comprising:
receiving an observed audio segment at a client computing device;
identifying an archived audio segment of broadcast content that includes at least a portion of the observed audio segment based on a plurality of hash values corresponding to the archived audio segment and a plurality of hash values corresponding to the observed audio segment, wherein the hash values corresponding to the archived audio segment are stored at the client computing device;
transmitting tracking data from the client computing device to a content server remote from the client computing device in response to identifying the archived audio segment, the tracking data including an identifier of the archived audio segment and an identifier of a geographic location of the client computing device; and
receiving, at the client computing device, from the content server, (a) supplemental content that is associated with the broadcast content and that is also associated with a geographic area that encompasses the geographic location of the client computing device, and (b) an indication of a number of responses that the content server received in response to the content server sending the supplemental content.

12. The computer program product of claim 11, wherein the process further comprises
receiving the tracking data at the content server;
identifying the geographic area associated with the broadcast content;
making a determination that the geographic location received from the client computing device is within the identified geographic area; and
in response to making the determination, transmitting the supplemental content from the content server to the client computing device.

13. The computer program product of claim 12, wherein the geographic area includes a user-defined area.

14. The computer program product of claim 11, wherein identifying the archived audio segment further comprises:
performing a comparison of each of the plurality of hash values corresponding to the observed audio segment with at least one of the hash values corresponding to the archived audio segment.

* * * * *